United States Patent
Tomago et al.

(10) Patent No.: US 11,774,464 B2
(45) Date of Patent: Oct. 3, 2023

(54) SENSOR SYSTEM

(71) Applicant: OMRON Corporation, Kyoto (JP)

(72) Inventors: Norihiro Tomago, Maizuru (JP);
Kiyoshi Imai, Ayabe (JP); Yusuke Iida, Ayabe (JP); Yusuke Shibasaki, Hukuchiyama (JP)

(73) Assignee: OMRON Corporation, Kyoto (JP)

( * ) Notice: Subject to any disclaimer, the term of this patent is extended or adjusted under 35 U.S.C. 154(b) by 232 days.

(21) Appl. No.: 17/043,641

(22) PCT Filed: Apr. 25, 2019

(86) PCT No.: PCT/JP2019/017730
§ 371 (c)(1),
(2) Date: Sep. 29, 2020

(87) PCT Pub. No.: WO2019/216250
PCT Pub. Date: Nov. 14, 2019

(65) Prior Publication Data
US 2021/0018528 A1    Jan. 21, 2021

(30) Foreign Application Priority Data

May 7, 2018   (JP) ................. 2018-089206
Nov. 5, 2018  (JP) ................. 2018-207928

(51) Int. Cl.
*G01P 3/68* (2006.01)
*B65G 43/08* (2006.01)

(52) U.S. Cl.
CPC ............... *G01P 3/68* (2013.01); *B65G 43/08* (2013.01)

(58) Field of Classification Search
None
See application file for complete search history.

(56) References Cited

U.S. PATENT DOCUMENTS 5,335,777 A    8/1994  Murphy et al.
6,711,461 B2   3/2004  Flores
(Continued)

FOREIGN PATENT DOCUMENTS

CN    1115572    1/1996
CN    1447201    10/2003
(Continued)

OTHER PUBLICATIONS

Machine Translation of Fuji Hiroko et al. (Year: 2017).*
(Continued)

*Primary Examiner* — Matthew G Marini
(74) *Attorney, Agent, or Firm* — JCIPRNET

(57) ABSTRACT

The present invention provides a sensor system with which a change in the state of a workpiece which has occurred in a conveyance process can be detennined. The sensor system comprises: a plurality of sensors positioned along a line and measuring data indicating that a workpiece being conveyed upon the line has passed thereby; a plurality of slave units respectively connected to the plurality of sensors and acquiring the data measured by the plurality of sensors; and a master unit connected to the plurality of slave units. The master unit comprises: a storage part for storing the data in association with information which relates to the timing at which the data was measured; and a determination part for comparing the data transmitted from two or more of the plurality of slave units using the information which relates to the timing, and determining a change in the state of the workpiece.

20 Claims, 25 Drawing Sheets

(56) References Cited

U.S. PATENT DOCUMENTS

| | | | |
|---|---|---|---|
| 2001/0046042 A1 | 11/2001 | Theile et al. | |
| 2008/0234858 A1* | 9/2008 | Dollens | B65G 43/08 |
| | | | 700/230 |
| 2009/0016475 A1* | 1/2009 | Rischar | H04J 3/0697 |
| | | | 375/356 |

FOREIGN PATENT DOCUMENTS

| | | | | |
|---|---|---|---|---|
| CN | 102483623 | | 5/2012 | |
| CN | 104216350 | | 12/2014 | |
| CN | 106063197 | | 10/2016 | |
| EP | 2730984 | | 5/2014 | |
| EP | 3061197 A1 * | | 8/2016 | ......... H02J 7/00036 |
| JP | S6127866 | | 2/1986 | |
| JP | H06305538 | | 11/1994 | |
| JP | 2005032033 | | 2/2005 | |
| JP | 2008197901 | | 8/2008 | |
| JP | 2008290042 | | 12/2008 | |
| JP | 2011051763 | | 3/2011 | |
| JP | 2011051763 A * | | 3/2011 | |
| JP | 2014085833 | | 5/2014 | |
| JP | 2014096036 | | 5/2014 | |
| JP | 2016146088 | | 8/2016 | |
| JP | 2017067753 | | 4/2017 | |
| WO | 2015133175 | | 9/2015 | |
| WO | 2016143546 | | 9/2016 | |
| WO | WO-2017037774 A1 * | | 3/2017 | ............. B65G 43/08 |

OTHER PUBLICATIONS

Machine Translation of Tanaka (Year: 2011).*
"Office Action of China Counterpart Application" with English translation thereof, dated Feb. 23, 2022, p. 1-p. 20.
"International Search Report (Form PCT/ISA/210) of PCT/JP2019/017730", dated Jun. 4, 2019, with English translation thereof, pp. 1-3.
"Written Opinion of the International Searching Authourity (Form/ISA/237) of PCT/JP2019/017730", dated Jun. 4, 2019, with English translation thereof, p. 1-p. 6.
"Office Action of Taiwan Counterpart Application" with English translation thereof, dated Jan. 2, 2020, p. 1-p. 7.
"Search Report of Europe Counterpart Application", dated Dec. 14, 2021, p. 1-p. 11.
Office Action of Japan Counterpart Application, with English translation thereof, dated Jan. 20, 2022, pp. 1-9.

* cited by examiner

SENSOR SYSTEM

CROSS-REFERENCE TO RELATED APPLICATION

This application is a 371 of international application of PCT application serial no. PCT/JP2019/017730, filed on Apr. 25, 2019, which claims the priority benefit of Japan application no. 2018-089206, filed on May 7, 2018, and Japan application no. 2018-207928, filed on Nov. 5, 2018. The entirety of each of the above-mentioned patent applications is hereby incorporated by reference herein and made a part of this specification.

TECHNICAL FIELD

The present disclosure relates to a sensor system.

BACGROUND ART

Conventionally, there are cases in which a plurality of sensors are positioned along a line and the presence or absence of a workpiece being conveyed upon the line is obtained by measurement. Data measured by a plurality of sensors may be acquired by a plurality of slave units and transferred to a master unit, thereby being collected in a control device such as a programmable logic controller (PLC) connected to the master unit.

The following Patent Literature 1 describes a sensor system including a plurality of slave units and a communication device transmitting information received from each of the slave units to a control device. Each slave unit triggered by a synchronization signal sent from any slave unit transmits detection information such as sensing data to the communication device after a standby time set for each slave unit has elapsed. Here, the standby time for each slave unit is set to differ from the standby times of the rest of the slave units. According to the technology described in Patent Literature 1, when data measured by a plurality of sensors is collected in a control device, data can be transmitted without waiting for a command from the control device, and thus the communication speed can be improved.

CITATION LIST

Patent Literature

[Patent Literature 1]
  Japanese Patent Laid-Open No. 2014-96036

SUMMARY OF INVENTION

Technical Problem

However, in the related art, even when data which relates to the presence or absence of a workpiece is measured continuously by a plurality of sensors, each piece of data is often utilized independently. When data measured by different sensors is utilized independently, since a master unit does not have information which relates to measurement times of respective pieces of data, it is not possible to distinguish the positional relationships in which data is measured by different sensors. For this reason, if there is an abnormality in a line causing a change in state such as a positional deviation or falling of a workpiece in a conveyance process, it is difficult to detect the change.

Hence, the present invention provides a sensor system with which a change in state of a workpiece which has occurred in a conveyance process can be determined.

Solution to Problem

According to an aspect of the present disclosure, there is provided a sensor system including a plurality of sensors positioned along a line and measuring data indicating that a passing state of a workpiece being conveyed upon the line, a plurality of slave units respectively connected to the plurality of sensors and acquiring the data measured by the plurality of sensors, and a master unit connected to the plurality of slave units. The master unit has a storage part for storing the data in association with information which relates to the timing at which the data was measured; and a determination part for comparing the data transmitted from two or more of the plurality of slave units using the information which relates to the timing, and determining a change in state of the workpiece.

According to this aspect, since the data measured by the plurality of sensors is stored in association with information which relates to the timing at which the data was measured, the positional relationships in which data is measured by different sensors become apparent, and thus it is possible to determine a change in state of a workpiece being conveyed upon the line.

In the foregoing aspect, the determination part may calculate timings at which the workpiece has to pass through detection ranges of the plurality of sensors on the basis of a conveyance speed of the line and positions of the plurality of sensors; compare the data measured by a sensor, of the plurality of sensors, positioned upstream in the line and the data measured at the timing at which the workpiece has to pass by with a sensor, of the plurality of sensors, positioned downstream in the line; and determine a positional deviation of the workpiece.

According to this aspect, since the data measured by the sensor positioned upstream in the line and the data measured by the sensor positioned downstream in the line are compared to each other in consideration of a time delay due to conveyance of a workpiece, it is possible to determine whether the location of the workpiece has changed in a conveyance process.

In the foregoing aspect, the determination part may determine a change in the conveyance speed of the workpiece on the basis of a difference between a time period during which the workpiece is detected by the sensor positioned upstream in the line and a time period during which the workpiece is detected by the sensor positioned downstream in the line.

According to this aspect, since a time period during which a workpiece is detected by the sensor positioned upstream in the line and a time period during which a workpiece is detected by the sensor positioned downstream in the line are compared to each other, it is possible to determine whether the conveyance speed of the workpiece has changed.

In the foregoing aspect, the determination part may determine falling of the workpiece on the basis of a correspondence relationship between the data measured by the sensor positioned upstream in the line and the data measured by the sensor positioned downstream in the line.

According to this aspect, when the data measured by the sensor positioned upstream in the line and the data measured by the sensor positioned downstream in the line do not correspond to each other in a one-to-one manner, it is possible to determine that falling of a workpiece has occurred.

In the foregoing aspect, the storage part may store a learned model generated through machine learning using learning data including the data measured by the sensor positioned upstream in the line, the data measured by the sensor positioned downstream in the line, and information indicating a change in state of the workpiece. The determination part may input at least the data measured by the sensor positioned upstream in the line and the data measured by the sensor positioned downstream in the line to the learned model and determine a change in state of the workpiece on the basis of the output of the learned model.

According to this aspect, even if the conveyance speed of the line and the positions of the plurality of sensors are not necessarily known, it is possible to determine whether the state of a workpiece has changed by means of the learned model generated on the basis of data which has actually been measured.

In the foregoing aspect, the master unit may have a timer. The storage part may store a time measured by the timer in association with the data.

According to this aspect, since a timer is provided in only the master unit without providing timers in the plurality of slave units, a simple configuration allows the data measured by the plurality of sensors to be stored in association with the timing at which the data was measured.

In the foregoing aspect, the master unit may have a trigger sending part for sending a trigger signal which serves as a time reference to the plurality of slave units. The plurality of slave units may respectively have timers, measure elapsed times after the trigger signals are received by the timers, and transmit the elapsed times together with the data to the master unit. The storage part may store the elapsed times in association with the data.

According to this aspect, it is possible to store the data measured by the plurality of sensors in association with the timing at which the data was measured without providing a timer in the master unit.

In the foregoing aspect, the plurality of slave units may respectively have timers for performing synchronization between the plurality of slave units and transmit the times measured by the timers together with the data to the master unit. The storage part may store the times measured by the timers in association with the data.

According to this aspect, it is possible to reduce a processing load of the master unit and to store the data measured by the plurality of sensors in association with the timing at which the data was measured.

In the foregoing aspect, the master unit may have a reception part for receiving a signal which serves as a time reference from an external instrument. The storage part may store a time calculated on the basis of a signal which serves as the time reference in association with the data.

According to this aspect, it is possible to store the data measured by the plurality of sensors in association with the timing at which the data was measured without providing timers in the plurality of slave units and the master unit.

In the foregoing aspect, the master unit may further have a correction part for correcting the information which relates to the timing on the basis of at least any of response times of the sensors and transmission delay times from the slave units to the master unit.

According to this aspect, information which relates to the timings at which data was measured by the plurality of sensors is stored more accurately, and thus it is possible to determine a change in state of a workpiece being conveyed upon the line with higher accuracy.

In the foregoing aspect, the data may be time series data including rising waveforms or falling waveforms in accordance with the passing states of the workpiece being conveyed upon the line. The master unit may further include a mapping part for mapping the rising waveforms or the falling waveforms acquired by two or more of the plurality of slave units regarding the same workpiece on the basis of intervals of the rising waveforms or intervals of the falling waveforms included in the time series data acquired by the two or more slave units.

According to this aspect, since the rising waveforms or the falling waveforms acquired by two or more slave units are mapped regarding the same workpiece, the time series data measured by the plurality of sensors can be appropriately compared to each other, and thus it is possible to appropriately determine a change in state of a workpiece being conveyed upon the line.

In the foregoing aspect, the mapping part may perform mapping of rising waveforms or falling waveforms acquired by a first slave unit of the plurality of slave units and rising waveforms or falling waveforms acquired by a second slave unit of the plurality of slave units such that an average value of differences between the intervals of the rising waveforms or the intervals of the falling waveforms acquired by the first slave unit and the intervals of the rising waveforms or the intervals of the falling waveforms acquired by the second slave unit decreases.

According to this aspect, since the average value of the differences between the intervals of the rising waveforms or the falling waveforms measured by two sensors is adopted as an evaluation value, even when the conveyance speed of the line temporarily becomes slower or faster, the time series data measured by two sensors can be mapped appropriately.

In the foregoing aspect, in a case in which the sensor connected to the first slave unit is positioned upstream in the line from the sensor connected to the second slave unit, the mapping part may perform mapping of rising waveforms or falling waveforms acquired by the first slave unit and rising waveforms or falling waveforms acquired by the second slave unit such that the average value of the differences between the intervals of the rising waveforms or the intervals of the falling waveforms acquired by the first slave unit and the intervals of the rising waveforms or the intervals of the falling waveforms acquired thereafter by the second slave unit decreases.

According to this aspect, since a combination of average values which have to be calculated in accordance with the positions of the plurality of sensors is limited, it is possible to reduce a computation load.

In the foregoing aspect, the mapping part may perform mapping of rising waveforms or falling waveforms acquired by the first slave unit and rising waveforms or falling waveforms acquired by the second slave unit from combinations in which a number of items for calculating the average value is equal to or greater than a predetermined number.

According to this aspect, it is possible to reduce a probability of erroneous mapping of rising waveforms or falling waveforms, and thus it is possible to perform more appropriate mapping.

In the foregoing aspect, the mapping part may perform mapping of rising waveforms or falling waveforms acquired by the first slave unit and rising waveforms or falling waveforms acquired by the second slave unit such that the number of items for calculating the average value increases.

According to this aspect, it is possible to improve the reliability of mapping by prioritizing mapping using a large amount of data.

In the foregoing aspect, in a case in which the determination part continuously determines that the state of the workpiece has changed throughout a predetermined time period, the mapping part may perform mapping of the rising waveforms or the falling waveforms.

According to this aspect, when it is erroneously determined in a continuous manner that there is an abnormality in the line due to inappropriate mapping of the rising waveforms, mapping of the rising waveforms can be revised automatically, and thus it is possible to correctly determine the state of the line.

In the foregoing aspect, the mapping part may perform mapping of the rising waveforms or the falling waveforms regarding a selected portion of the plurality of slave units.

According to this aspect, since a slave unit for executing mapping is selected, it is possible to omit mapping of data which is not certainly necessary and reduce a processing load.

In the foregoing aspect, the master unit may further include a display part for displaying that mapping is being executed by the mapping part.

According to this aspect, it is possible to visually inform that the master unit is in a state in which the state of a workpiece cannot be determined temporarily.

In the foregoing aspect, the data may be time series data including rising waveforms or falling waveforms in accordance with the passing states of the workpiece being conveyed upon the line. The determination part may compare the time series data acquired by the first slave unit of the plurality of slave units and the time series data acquired by the second slave unit of the plurality of slave units after shifting any one thereof by a predetermined time and determine a change in state of the workpiece on the basis of a time difference between the rising waveforms or the falling waveforms acquired by the first slave unit and the rising waveforms or the falling waveforms acquired by the second slave unit.

According to this aspect, even when the conveyance speed of the line temporarily becomes slower or faster, the time series data measured by two sensors is compared appropriately, and thus it is possible to detect a deviation in the data.

In the foregoing aspect, in a case in which the sensor connected to the first slave unit is positioned upstream in the line from the sensor connected to the second slave unit, the determination part may determine that the workpiece has fallen from the line when the rising waveforms or the falling waveforms acquired by the second slave unit corresponding to the rising waveforms or the falling waveforms acquired by the first slave unit is not present.

According to this aspect, it is possible to determine that falling of a workpiece has occurred by identifying a case in which a workpiece is detected by the sensor positioned upstream in the line but no workpiece is detected by the sensor positioned downstream in the line.

In the foregoing aspect, in a case in which the sensor connected to the first slave unit is positioned upstream in the line from the sensor connected to the second slave unit, the determination part may determine that the workpiece has been incorporated into the line when the rising waveforms or the falling waveforms acquired by the first slave unit corresponding to the rising waveforms or the falling waveforms acquired by the second slave unit is not present.

According to this aspect, it is possible to determine that incorporation of a workpiece has occurred by identifying a case in which no workpiece is detected by the sensor positioned upstream in the line but a workpiece is detected by the sensor positioned downstream in the line.

In the foregoing aspect, the determination part may shift any one of the time series data acquired by the first slave unit of the plurality of slave units and the time series data acquired by the second slave unit of the plurality of slave units by a predetermined time and divide each piece of the time series data into a plurality of sections such that one or fewer rising waveform or falling waveform is included.

According to this aspect, the time series data is compared for each of the plurality of sections, and thus it is possible to determine a change in state of a workpiece.

In the foregoing aspect, the determination part may calculate a first time difference between the rising waveforms or the falling waveforms acquired by the first slave unit included in a first section of the plurality of sections and the rising waveforms or the falling waveforms acquired by the second slave unit included in the first section and a second time difference between the rising waveforms or the falling waveforms acquired by the first slave unit included in a second section of the plurality of sections and the rising waveforms or the falling waveforms acquired by the second slave unit included in the second section, and determine a change in state of the workpiece on the basis of a difference between the first time difference and the second time difference.

According to this aspect, even when the conveyance speed of the line temporarily becomes slower or faster, the time series data measured by two sensors is compared appropriately, and thus it is possible to detect a deviation in the data.

In the foregoing aspect, the determination part may determine a change in state of the workpiece by comparing pieces of the time series data which are acquired by three or more slave units, of the plurality of slave units, positioned in order along the line and shifted by a predetermined time and determine an abnormal section in the line on the basis of a determined section in which the state of the workpiece has changed.

According to this aspect, it is possible to identify not only a fact that an abnormality has occurred in the line but also a section in which an abnormality has occurred, and thus it is possible to send information for identifying a cause of an abnormality at an earlier stage.

Advantageous Effects of Invention

According to the present invention, a sensor system with which a change in state of a workpiece which has occurred in a conveyance process can be determined is provided.

DESCRIPTION OF EMBODIMENT

Hereinafter, an embodiment (which will hereinafter be stated as "the present embodiment") according to aspects of the present invention will be described on the basis of the drawings. In each diagram, elements to which the same reference sign is applied have the same configuration or a similar configuration.

Figure 1:
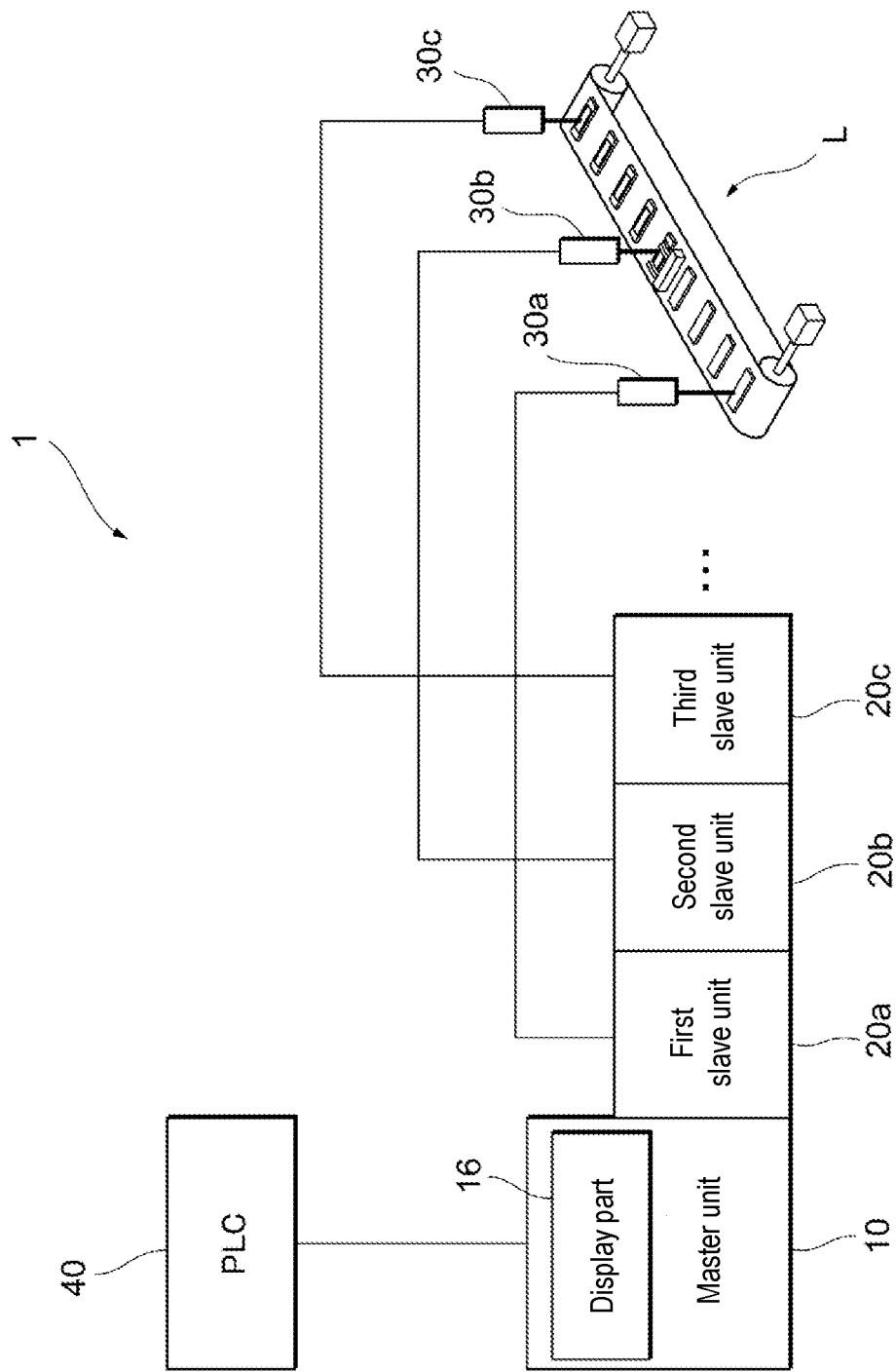
FIG. 1 is a diagram showing an overview of a sensor system according to an embodiment of the present invention.

FIG. 1 is a diagram showing an overview of a sensor system 1 according to the embodiment of the present invention. The sensor system 1 includes a master unit 10, a first slave unit 20a, a second slave unit 20b, a third slave unit 20c, a first sensor 30a, a second sensor 30b, a third sensor 30c, and a PLC 40. Here, the first sensor 30a, the second sensor 30b, and the third sensor 30c correspond to a plurality of sensors positioned along a line L and measuring data indicating a passing state of a workpiece being conveyed upon the line L. In addition, the first slave unit 20a, the second slave unit 20b, and the third slave unit 20c correspond to a plurality of slave units respectively connected to the plurality of sensors and acquiring the data measured by the plurality of sensors. More specifically, the first slave unit 20a is connected to the first sensor 30a, the second slave unit 20b is connected to the second sensor 30b, and the third slave unit 20c is connected to the third sensor 30c. The PLC 40 corresponds to a control device. Further, the master unit 10 corresponds to a master unit connected to the plurality of slave units and the control device. In this specification, the first slave unit 20a, the second slave unit 20b, and the third slave unit 20c will be generically called slave units 20, and the first sensor 30a, the second sensor 30b, and the third sensor 30c will be generically called sensors 30.

The configuration of the sensor system 1 according to the present embodiment is an example, and the number of a plurality of sensors and the number of a plurality of slave units included in the sensor system 1 are arbitrary. In addition, the control device is not necessarily the PLC 40.

The master unit 10 may be connected to the PLC 40 via a communication network such as a local area network (LAN). The slave units 20 are physically and electrically connected to the master unit 10. In the present embodiment, the master unit 10 stores information received from the slave units 20 in a storage part and transmits the stored information to the PLC 40. Therefore, data acquired by the slave units 20 is unified by the master unit 10 and is transmitted to the PLC 40.

As an example, a determination signal and detection information are transmitted from the slave units 20 to the master unit 10. The determination signal is a signal indicating a determination result which relates to a workpiece and is determined by the slave units 20 on the basis of the data measured by the sensors 30. For example, when the sensors 30 are photoelectric sensors, the determination signal may be an on signal or an off signal obtained by the slave units 20 comparing the amount of received light measured by the sensors 30 to a threshold. The detection information is a detection value obtained through detection operation of the slave units 20. For example, when the sensors 30 are photoelectric sensors, detection operation may be operation of light projecting and light receiving, and detection information may be an amount of received light.

The slave units 20 may be attached to a side surface of the master unit 10. Regarding communication between the master unit 10 and the slave units 20, parallel communication or serial communication may be used. That is, the master unit 10 and the slave units 20 may be physically connected to each other through serial transmission paths and parallel transmission paths. For example, the determination signal may be transmitted from the slave units 20 to the master unit 10 through the parallel transmission paths, and the detection information may be transmitted from the slave units 20 to the master unit 10 through the serial transmission paths. The master unit 10 and the slave units 20 may be connected to each other through any of the serial transmission paths and the parallel transmission paths.

Figure 2:
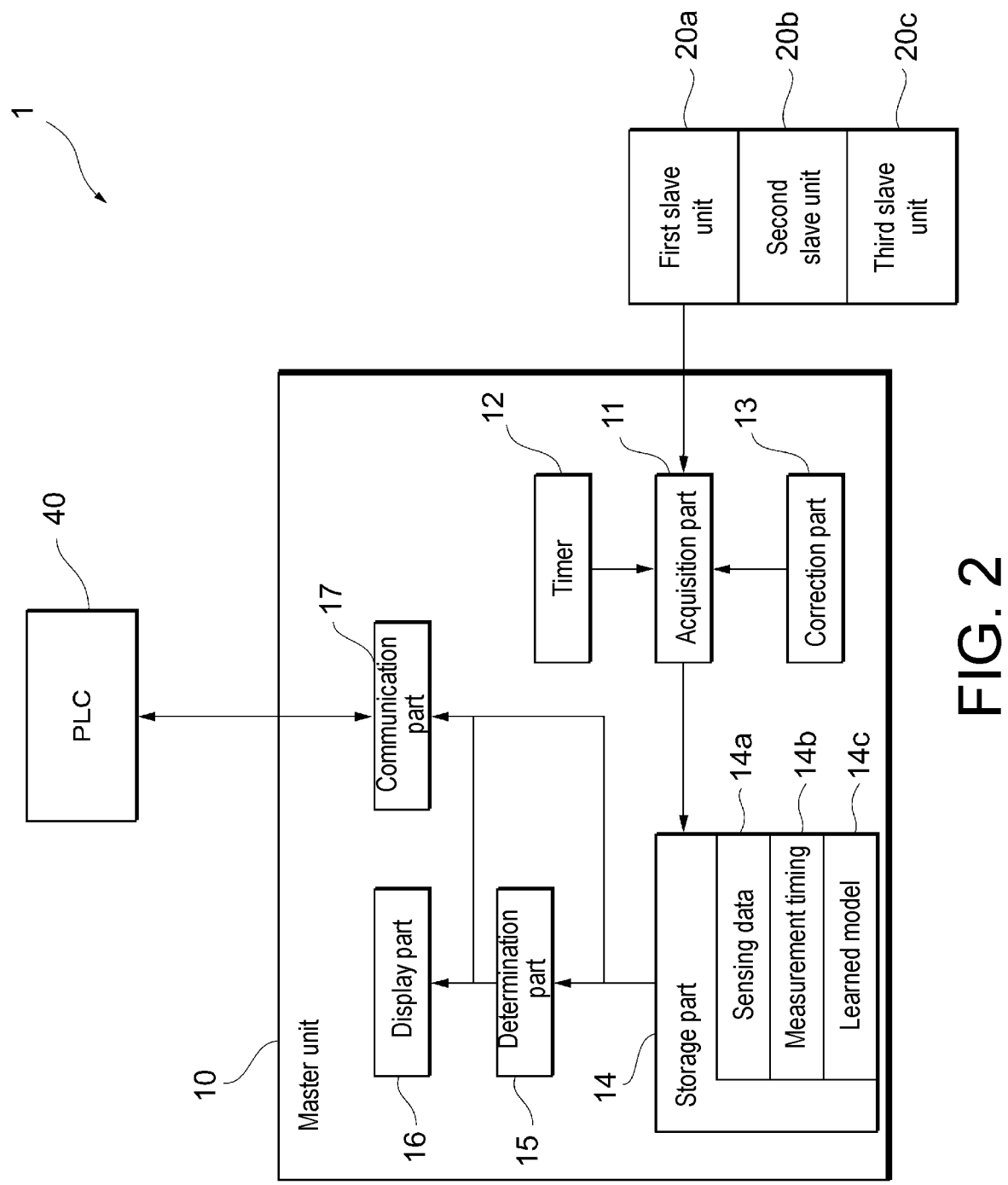
FIG. 2 is a diagram showing a functional block of a master unit according to the present embodiment.

FIG. 2 is a diagram showing a functional block of the master unit 10 according to the present embodiment. The master unit 10 includes an acquisition part 11, a timer 12, a correction part 13, a storage part 14, a determination part 15, a display part 16, and a communication part 17.

The acquisition part 11 acquires data from the plurality of slave units 20. The acquisition part 11 may acquire a determination signal indicating a passing state of a workpiece from the slave units 20 through the parallel transmission paths and may acquire detection information measured by the plurality of sensors 30 from the slave units 20 through the serial transmission paths.

The timer 12 measures a time and may be an electronic timepiece, for example, measuring a time on the basis of a predetermined frequency. For example, the timer 12 may measure the year, the month, the day, the hour, the minute, and the second in units of milliseconds. In addition, the timer 12 may measure an elapsed time from a reference time.

The correction part 13 corrects information which relates to the timing at which data was measured on the basis of at least any of response times of the plurality of sensors 30 and transmission delay times from the plurality of slave units 20 to the master unit 10. Here, information which relates to the timing may be any information as long as it expresses a timing at which data was measured. The information may be information absolutely expressing a time at which data is measured or may be information relatively expressing a time at which data is measured. A slight time lag occurs during a period from the time when the plurality of sensors 30 performs detection operation to the time when a passing workpiece is detected and the detection information is output. In addition, a slight time lag also occurs when data is transmitted from the plurality of slave units 20 to the master unit 10. In consideration of such time lags, the correction part 13 may subtract at least any of the response times of the plurality of sensors 30 and the transmission delay times from the plurality of slave units 20 to the master unit 10 from the time measured by the timer 12 such that information which relates to the timing at which data was measured can be recorded more accurately. Accordingly, information which relates to the timings at which data was measured by the plurality of sensors 30 can be stored more accurately, and a change in state of a workpiece being conveyed upon the line L can be determined with higher accuracy.

Since the response times of the plurality of sensors 30 may differ depending on the type of sensor, the correction part 13 may adjust the response times in accordance with the type of the sensors 30 connected to the slave units 20. In addition, since the transmission delay times from the plurality of slave units 20 to the master unit 10 become longer toward the slave units 20 farther from the master unit 10, the transmission delay times may be adjusted in accordance with the section where the slave unit 20 transmitting data is connected.

The storage part 14 stores data acquired from the plurality of slave units 20 in association with information which relates to the timings at which the data was measured by the plurality of sensors 30. In the same diagram, the data acquired from the plurality of slave units 20 is expressed as sensing data 14a, and the timing at which the data was measured by the plurality of sensors 30 is expressed as a measurement timing 14b.

The storage part 14 may store the time measured by the timer 12 in association with the sensing data 14a. The storage part 14 may store a time obtained by the correction part 13 which has corrected the time measured by the timer 12 in association with the sensing data 14a. In this manner, since the timer 12 is provided in only the master unit 10 without providing timers in the plurality of slave units 20, a simple configuration allows the data measured by the plurality of sensors 30 to be stored in association with information which relates to the timing at which the data was measured.

The determination part 15 compares pieces of data transmitted from two or more slave units 20 of the plurality of slave units 20 using information which relates to the timing at which the data was measured and determines a change in state of a workpiece. More specifically, pieces of information which relate to the measurement timings of data transmitted from a certain slave unit 20 and data transmitted from other slave units 20 are compared to each other, and a deviation between the data measured earlier and the data measured later is detected. The determination part 15 may determine a positional deviation of a workpiece by calculating timings at which a workpiece has to pass through detection ranges of the plurality of sensors 30 on the basis of the conveyance speed of the line L and the positions of the plurality of sensors 30, calculating a normal deviation between the data measured earlier and the data measured later, and comparing the normal deviation and the deviation in the data actually measured.

In this manner, since the data measured by the plurality of sensors 30 is stored in association with information which relates to the timing at which the data was measured, the positional relationships in which data is measured by different sensors become apparent, and thus it is possible to determine a change in state of a workpiece being conveyed upon the line L. For this reason, when the state of a workpiece has changed in a conveyance process, an abnormality which relates to the line L can be detected.

The storage part 14 may store a learned model 14c generated through machine learning using learning data including data measured by sensors positioned upstream in the line L, data measured by sensors positioned downstream in the line L, and information indicating a change in state of a workpiece. Here, learning data may be stored in the master unit 10 or may be stored in a different device. Processing of generating a learned model may be executed by the master unit 10 or may be executed by a different device. For example, when a learning model is a neural network, the master unit 10 or a different device may input the input data included in the learning data to the neural network and may update the weight of the neural network by an error back propagation method on the basis of the difference between an output thereof and label data included in the learning data. A learning model is not limited to a neural network and may be a regression model or a decision tree, and machine learning may be executed by an arbitrary algorithm.

The determination part 15 may input at least data measured by the sensor positioned upstream in the line L and the data measured by the sensor positioned downstream in the line L to the learned model 14c and determine a change in state of a workpiece on the basis of the output of the learned model 14c. By means of the learned model 14c, the determination part 15 may determine not only a change in state of a workpiece but also the kind of change in state such as a positional deviation or falling of a workpiece. In this manner, even if the conveyance speed of the line L and the positions of the plurality of sensors 30 are not necessarily known, it is possible to determine whether the state of a workpiece has changed by means of the learned model 14c generated on the basis of data actually measured.

The display part 16 displays a determination result of the determination part 15. For example, the display part 16 may be a binary lamp showing the presence or absence of an abnormality which relates to the line L or may be a liquid crystal display device specifically displaying the determination result of the determination part 15.

The communication part 17 is an interface for performing communication with the PLC 40. The communication part 17 may perform communication with an external instrument other than the PLC 40.

Figure 3:
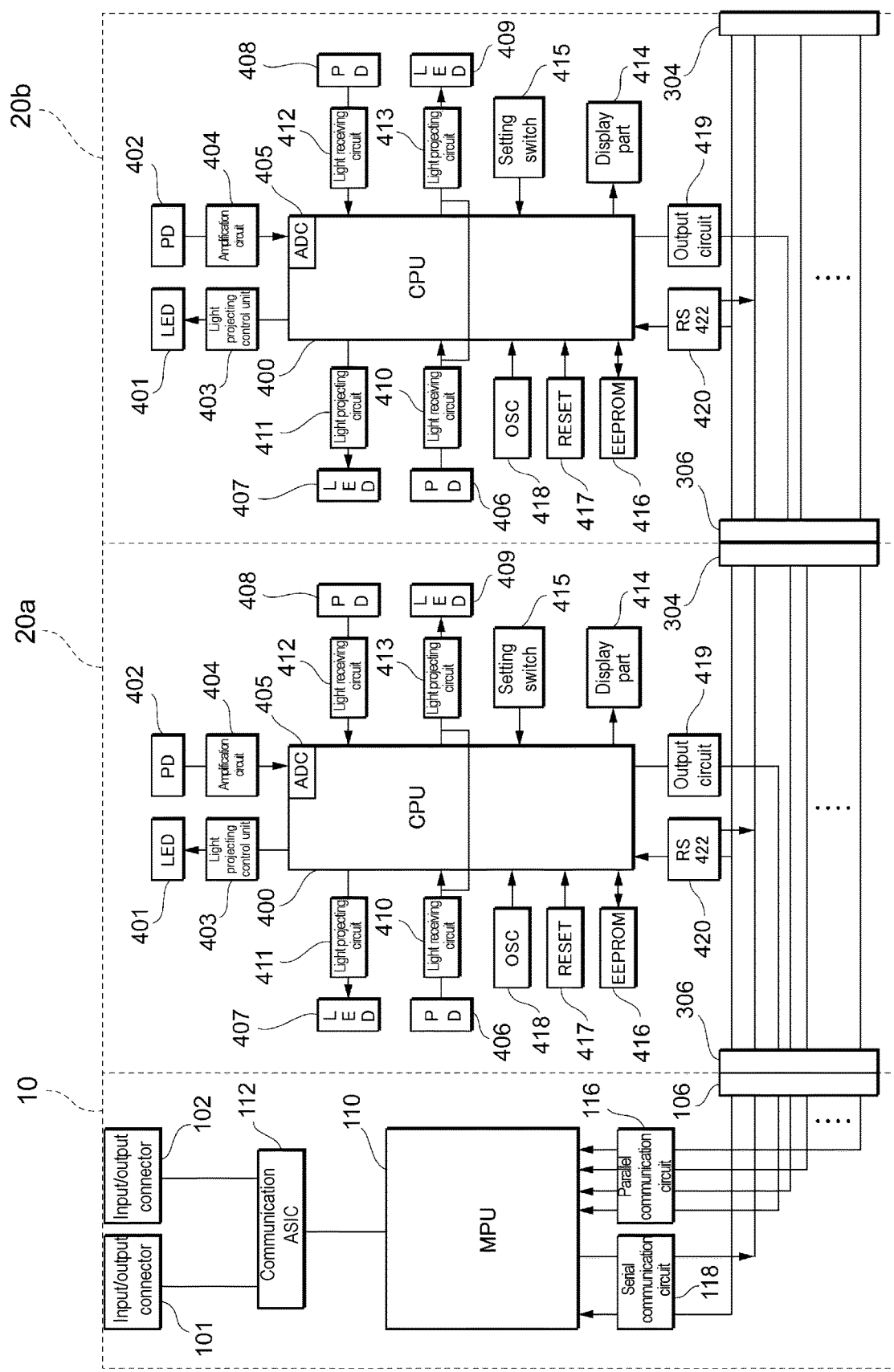
FIG. 3 is a diagram showing a physical configuration of the sensor system according to the present embodiment.

FIG. 3 is a diagram showing a physical configuration of the sensor system 1 according to the present embodiment. The master unit 10 includes input/output connectors 101 and 102 used for connection to the PLC 40, a connection connector 106 used for connection to the slave units 20, and a power input connector.

In addition, the master unit 10 includes a micro processing unit (MPU) 110, a communication application specific integrated circuit (ASIC) 112, a parallel communication circuit 116, a serial communication circuit 118, and a power supply circuit.

The MPU 110 operates such that all the steps of processing in the master unit 10 are executed collectively. The communication ASIC 112 manages communication with the PLC 40. The parallel communication circuit 116 is used for parallel communication between the master unit 10 and the slave units 20. Similarly, the serial communication circuit 118 is used for serial communication between the master unit 10 and the slave units 20.

In the slave unit 20, connection connectors 304 and 306 for the master unit 10 or other slave units 20 are respectively provided in both side wall parts. A plurality of slave units 20 can be connected to the master unit 10 in a row. Signals from the plurality of slave units 20 are transmitted to adjacent slave units 20 and are transmitted to the master unit 10.

Windows for optical communication using infrared rays are respectively provided on both side surfaces of the slave unit 20. When the plurality of slave units 20 are joined to each other one by one and are positioned in a row utilizing the connection connectors 304 and 306, bidirectional optical communication can be performed utilizing infrared rays between adjacent slave units 20 through the windows for optical communication facing each other.

The slave unit 20 has various kinds of processing functions realized by a central processing unit (CPU) 400, and various kinds of processing functions realized by a dedicated circuit.

The CPU 400 controls a light projecting control unit 403 such that infrared rays are radiated from a light emitting element (LED) 401. A signal generated by a light receiving element (PD) 402 upon reception of light is amplified via an amplification circuit 404, is converted into a digital signal via an A/D converter 405 thereafter, and is taken into the CPU 400. In the CPU 400, light reception data, that is, the amount of received light is transmitted to the master unit 10 as detection information without any change. In addition, in the CPU 400, an on signal or an off signal obtained by determining whether or not the amount of received light is greater than a threshold set in advance is transmitted to the master unit 10 as a determination signal.

Moreover, the CPU 400 controls left and right light projecting circuits 411 and 413 such that infrared rays are radiated from left and right communication light emitting elements (LED) 407 and 409 to adjacent slave units 20. Infrared rays which have arrived from left and right adjacent slave units 20 are received by left and right light receiving elements (PD) 406 and 408 and arrive at the CPU 400 via light receiving circuits 410 and 412. The CPU 400 performs optical communication between left and right adjacent slave units 20 by controlling transmission/reception signals on the basis of a predetermined protocol.

The light receiving element 406, the communication light emitting element 409, the light receiving circuit 410, and the light projecting circuit 413 are utilized to transmit and receive synchronization signals for preventing mutual interference between the slave units 20. Specifically, in each slave unit 20, the light receiving circuit 410 and the light projecting circuit 413 are directly connected using wiring. Due to this configuration, a received synchronization signal is quickly transmitted to other adjacent slave units 20 from the communication light emitting element 409 via the light projecting circuit 413 without being subjected to delay processing by the CPU 400.

Moreover, the CPU 400 controls lighting of a display part 414. In addition, the CPU 400 performs processing of a signal from a setting switch 415. Various kinds of data necessary for operation of the CPU 400 are stored in a recording medium such as an electrically erasable programmable read only memory (EEPROM) 416. A signal obtained from a reset part 417 is sent to the CPU 400, and measurement control is reset. A standard clock is input from an oscillator (OSC) 418 to the CPU 400.

An output circuit 419 performs transmission processing of a determination signal obtained by comparing the amount of received light to the threshold. As described above, in the present embodiment, a determination signal is transmitted to the master unit 10 through parallel communication.

The transmission paths for parallel communication are transmission paths through which the master unit 10 and each slave unit 20 are individually connected to each other. That is, each of the plurality of slave units 20 is individually connected to the master unit 10 through separate parallel communication lines. However, parallel communication lines for connecting the slave units 20 other than the slave unit 20 adjacent to the master unit 10 and the master unit 10 to each other can pass through other slave units 20.

A serial communication driver 420 performs reception processing of a command or the like transmitted from the master unit 10, and transmission processing of detection information (amount of received light). In the present embodiment, an RS-422 protocol is used for serial communication. An RS-485 protocol may be utilized for serial communication.

The transmission paths for serial communication are transmission paths through which the master unit 10 and all the slave units 20 are connected to each other. That is, all the slave units 20 are connected to the master unit 10 in a bus form capable of transmitting a signal through serial communication lines.

Figure 4:
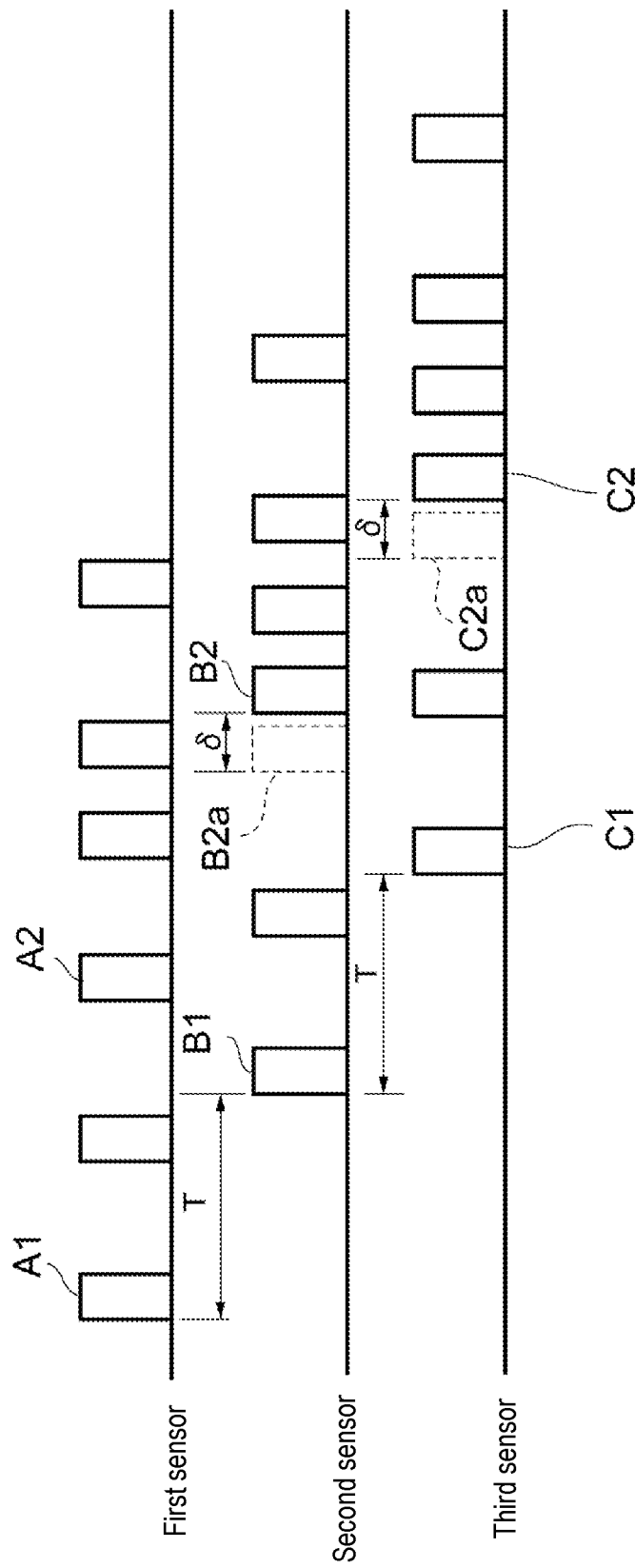
FIG. 4 is a diagram showing a first example of data measured by the sensor system according to the present embodiment.

FIG. 4 is a diagram showing a first example of data measured by the sensor system 1 according to the present embodiment. In this example, data measured by the first sensor 30a, the second sensor 30b, and the third sensor 30c is shown in a time series order. Here, the first sensor 30a is a sensor, of these three sensors, positioned at the upstream end in the line L. The third sensor 30c is a sensor, of these three sensors, positioned at the downstream end in the line L. The second sensor 30b is a sensor positioned downstream from the first sensor 30a and positioned upstream from the third sensor 30c. This example shows data which is measured when there is an abnormality in the line L between the place where the first sensor 30*a* is installed and the place where the second sensor 30*b* is installed and a positional deviation of a workpiece has occurred in a conveyance process.

Data measured by the first sensor 30*a* includes first data A1 and second data A2. Each of the first data A1 and the second data A2 is data indicating a passing state of a workpiece and is an on signal output when a workpiece is within the detection range of the first sensor 30*a*.

Data measured by the second sensor 30*b* includes first data B1 and second data B2. Each of the first data B1 and the second data B2 is data indicating passing states of a workpiece and is an on signal output when a workpiece is within the detection range of the second sensor 30*b*. Here, compared to the first data A1 measured by the first sensor 30*a*, the first data B1 measured by the second sensor 30*b* is delayed by a time T. The time T is a value obtained by dividing the distance between the first sensor 30*a* and the second sensor 30*b* by the conveyance speed of the line L.

On the other hand, compared to the second data A2 measured by the first sensor 30*a*, the second data B2 measured by the second sensor 30*b* is delayed by a time T+δ. In FIG. 4, a waveform B2*a* which appears when the second data B2 is measured in a manner of being delayed by the time T is indicated by a dotted line.

The determination part 15 may calculate timings at which a workpiece has to pass through the detection ranges of the plurality of sensors 30 on the basis of the conveyance speed of the line L and the positions of the plurality of sensors 30 and determine a positional deviation of a workpiece on the basis of comparison between the data measured by the sensor, of the plurality of sensors 30, positioned upstream in the line L and the data measured at the timing at which the workpiece has to pass by with the sensor, of the plurality of sensors 30, positioned downstream in the line L. In the case of this example, if the line L operates normally, the second data A2 measured by the first sensor 30*a* positioned upstream in the line L and the second data B2 measured by the second sensor 30*b* positioned downstream in the line L ought to coincide with each other except for the delay of the time T according to installation intervals between the sensors and the conveyance speed of the line L. In consideration of the delay of the time T, the determination part 15 detects that there is a difference of δ between the second data A2 measured by the first sensor 30*a* positioned upstream in the line L and the second data B2 measured by the second sensor 30*b* positioned downstream in the line L. When δ is equal to or greater than the threshold, the determination part 15 may determine that a positional deviation of a workpiece has occurred.

Since the data measured by the sensor positioned upstream in the line L and the data measured by the sensor positioned downstream in the line L are compared to each other in consideration of a time delay due to conveyance of a workpiece, it is possible to determine whether the location of the workpiece has changed.

In addition, the determination part 15 may determine a change in state of a workpiece by means of the learned model 14*c* generated through machine learning using learning data including the data measured by the first sensor 30*a* positioned upstream in the line L, the data measured by the second sensor 30*b* positioned downstream in the line L, and information indicating a change in state of a workpiece when the data was measured. In the case of this example, the determination part 15 may input the second data A2 measured by the first sensor 30*a* positioned upstream in the line L and the second data B2 measured by the second sensor 30*b* positioned downstream in the line L to the learned model 14*c* and determine a positional deviation of a workpiece on the basis of the output of the learned model 14*c*. Here, an output of the learned model 14*c* may be a probability of occurrence of a change in state of a workpiece or may be an amount of a positional deviation of a workpiece.

Data measured by the third sensor 30*c* includes first data C1 and second data C2. Each of the first data C1 and the second data C2 is data indicating a passing state of a workpiece and is an on signal output when a workpiece is within the detection range of the third sensor 30*c*. Here, compared to the first data B1 measured by the second sensor 30*b*, the first data C1 measured by the third sensor 30*c* is delayed by the time T.

On the other hand, compared to the second data A2 measured by the first sensor 30*a*, the second data C2 measured by the third sensor 30*c* is delayed by a time 2T+δ. In FIG. 4, a waveform C2*a* which appears when the second data C2 is measured in a manner of being delayed by a time 2T is indicated by a dotted line.

In consideration of the delay of the time T, the determination part 15 detects that there is a difference of δ between the second data A2 measured by the first sensor 30*a* positioned upstream in the line L and the second data C2 measured by the third sensor 30*c* positioned downstream in the line L. When δ is equal to or greater than the threshold, the determination part 15 may determine that a positional deviation of a workpiece has occurred. In consideration of the delay of the time T, the determination part 15 detects that there is a difference of δ between the second data B2 measured by the second sensor 30*b* positioned upstream in the line L and the second data C2 measured by the third sensor 30*c* positioned downstream in the line L. When δ is equal to or greater than the threshold, the determination part 15 may determine that a positional deviation of a workpiece has occurred. In addition, the determination part 15 may input the data measured by the first sensor 30*a*, the second sensor 30*b*, and the third sensor 30*c* to the learned model 14*c* and determine a change in state of a workpiece on the basis of the output of the learned model 14*c*.

In this manner, when the data measured by the second sensor 30*b* deviates with respect to the data measured by the first sensor 30*a*, the determination part 15 may determine that an abnormality is present in a conveyance apparatus of the line L between the place where the first sensor 30*a* is installed and the place where the second sensor 30*b* is installed. In addition, when the deviation in the data measured by the third sensor 30*c* is approximately the same as the deviation in the data measured by the second sensor 30*b*, the determination part 15 may determine that an abnormality is not present in the conveyance apparatus of the line L between the place where the second sensor 30*b* is installed and the place where the third sensor 30*c* is installed.

There may be a plurality of lines, and a line may convey workpieces in multiple rows. In such a case, the determination part 15 may compare pieces of data measured by the plurality of sensors positioned in the respective lines and determine whether or not operation of the respective lines is unstable. In addition, the determination part 15 may input the data measured by the plurality of sensors positioned on a plurality of lines to the learned model 14*c* and determine instability of the line on the basis of the output of the learned model 14*c*.

Figure 5:
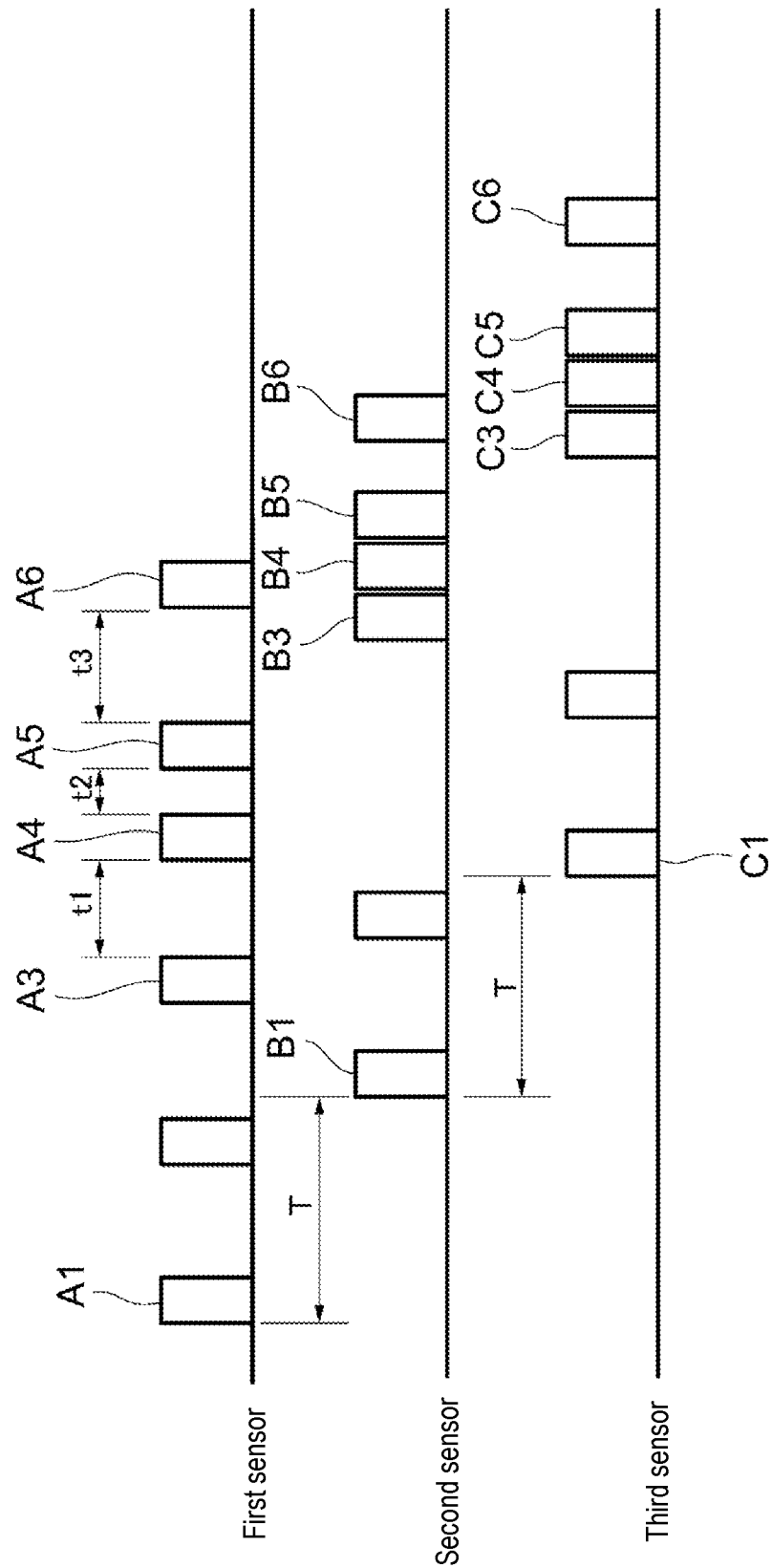
FIG. 5 is a diagram showing a second example of data measured by the sensor system according to the present embodiment.

FIG. 5 is a diagram showing a second example of data measured by the sensor system 1 according to the present embodiment. In this example, the positions of the first sensor 30a, the second sensor 30b, and the third sensor 30c are similar to those in the first example shown in FIG. 4. This example shows data which is measured when there is an abnormality in the line L between the place where the first sensor 30a is installed and the place where the second sensor 30b is installed, the conveyance speed of a workpiece is chronically delayed, and congestion has occurred in a flow of the workpiece.

The data measured by the first sensor 30a includes the first data A1, third data A3, fourth data A4, fifth data A5, and sixth data A6. Each of the first data A1, the third data A3, the fourth data A4, the fifth data A5, and the sixth data A6 is data indicating a passing state of a workpiece and is an on signal output when a workpiece is within the detection range of the first sensor 30a. Here, a time from falling of the third data A3 to rising of the fourth data A4 is t1. A time from falling of the fourth data A4 to rising of the fifth data A5 is t2. A time from falling of the fifth data A5 to rising of the sixth data A6 is t3.

The data measured by the second sensor 30b includes the first data B1, third data B3, fourth data B4, fifth data B5, and sixth data B6. Each of the first data B1, the third data B3, the fourth data B4, the fifth data B5, and the sixth data B6 is data indicating a passing state of a workpiece and is an on signal output when a workpiece is within the detection range of the second sensor 30b. Here, compared to the first data A1 measured by the first sensor 30a, the first data B1 measured by the second sensor 30b is delayed by the time T. The time T is a value obtained by dividing the distance between the first sensor 30a and the second sensor 30b by the conveyance speed of the line L.

On the other hand, compared to the third data A3, the fourth data A4, the fifth data A5, and the sixth data A6 measured by the first sensor 30a, the third data B3, the fourth data B4, the fifth data B5, and the sixth data B6 measured by the second sensor 30b have short intervals of falling and rising and are measured in a nearly continuous manner. That is, a time from falling of the third data B3 to rising of the fourth data B4 is nearly zero. A time from falling of the fourth data B4 to rising of the fifth data B5 is nearly zero. A time from falling of the fifth data B5 to rising of the sixth data B6 is nearly zero.

The determination part 15 may calculate timings at which a workpiece has to pass through the detection ranges of the plurality of sensors 30 on the basis of the conveyance speed of the line L and the positions of the plurality of sensors 30 and determine a positional deviation of a workpiece on the basis of comparison between the data measured by the sensor, of the plurality of sensors 30, positioned upstream in the line L and the data measured at the timing at which the workpiece has to pass by with the sensor, of the plurality of sensors 30, positioned downstream in the line L. In the case of this example, if the line L operates normally, the intervals of falling and rising of the third data A3, the fourth data A4, the fifth data A5, and the sixth data A6 measured by the first sensor 30a positioned upstream in the line L and the intervals of falling and rising of the third data B3, the fourth data B4, the fifth data B5, and the sixth data B6 measured by the second sensor 30b positioned downstream in the line L ought to coincide with each other except for the delay of the time T according to the installation intervals of the sensors and the conveyance speed of the line L. In consideration of the delay of the time T, the determination part 15 detects that there is a difference between the intervals of the waveforms measured by the first sensor 30a positioned upstream in the line L and the intervals of the waveforms measured by the second sensor 30b positioned downstream in the line L.

When the difference is equal to or greater than the threshold, the determination part 15 may determine that a positional deviation of a workpiece has occurred. In addition, the determination part 15 may detect that the intervals of falling and rising of the third data B3, the fourth data B4, the fifth data B5, and the sixth data B6 are nearly zero and determine that congestion has occurred in a flow of a workpiece.

Since the data measured by the sensor positioned upstream in the line L and the data measured by the sensor positioned downstream in the line L are compared to each other in consideration of a time delay due to conveyance of a workpiece, it is possible to determine whether the location of the workpiece has changed in a conveyance process. In addition, since the intervals of falling and rising of the data measured by the sensor positioned upstream in the line L and the intervals of falling and rising of the data measured by the sensor positioned downstream in the line L are compared to each other in consideration of a time delay due to conveyance of a workpiece, it is possible to determine whether congestion has occurred in a flow of the workpiece.

In addition, the data measured by the third sensor 30c includes the first data C1, third data C3, fourth data C4, fifth data C5, and sixth data C6. Each of the first data C1, the third data C3, the fourth data C4, the fifth data C5, and the sixth data C6 is data indicating a passing state of a workpiece and is an on signal output when a workpiece is within the detection range of the third sensor 30c. Here, compared to the first data B1 measured by the second sensor 30b, the first data C1 measured by the third sensor 30c is delayed by the time T. In addition, similar to the third data B3, the fourth data B4, the fifth data B5, and the sixth data B6 measured by the second sensor 30b, the intervals of falling and rising of the waveforms of the third data C3, the fourth data C4, the fifth data C5, and the sixth data C6 are nearly zero and indicate congestion of a workpiece.

In this manner, when the data measured by the second sensor 30b deviates with respect to the data measured by the first sensor 30a, the determination part 15 may determine that an abnormality is present in a conveyance apparatus of the line L between the place where the first sensor 30a is installed and the place where the second sensor 30b is installed. In addition, when the deviation in the data measured by the third sensor 30c is approximately the same as the deviation in the data measured by the second sensor 30b, the determination part 15 may determine that an abnormality is not present in the conveyance apparatus of the line L between the place where the second sensor 30b is installed and the place where the third sensor 30c is installed.

The determination part 15 may input the data measured by the first sensor 30a, the second sensor 30b, and the third sensor 30c to the learned model 14c and determine whether congestion has occurred in a flow of a workpiece on the basis of the output of the learned model 14c. In addition, the determination part 15 may input the data measured by the first sensor 30a, the second sensor 30b, and the third sensor 30c to the learned model 14c and determine a place in the conveyance apparatus having a comparatively high probability of occurrence of congestion of a workpiece on the basis of the output of the learned model 14c.

Figure 6:
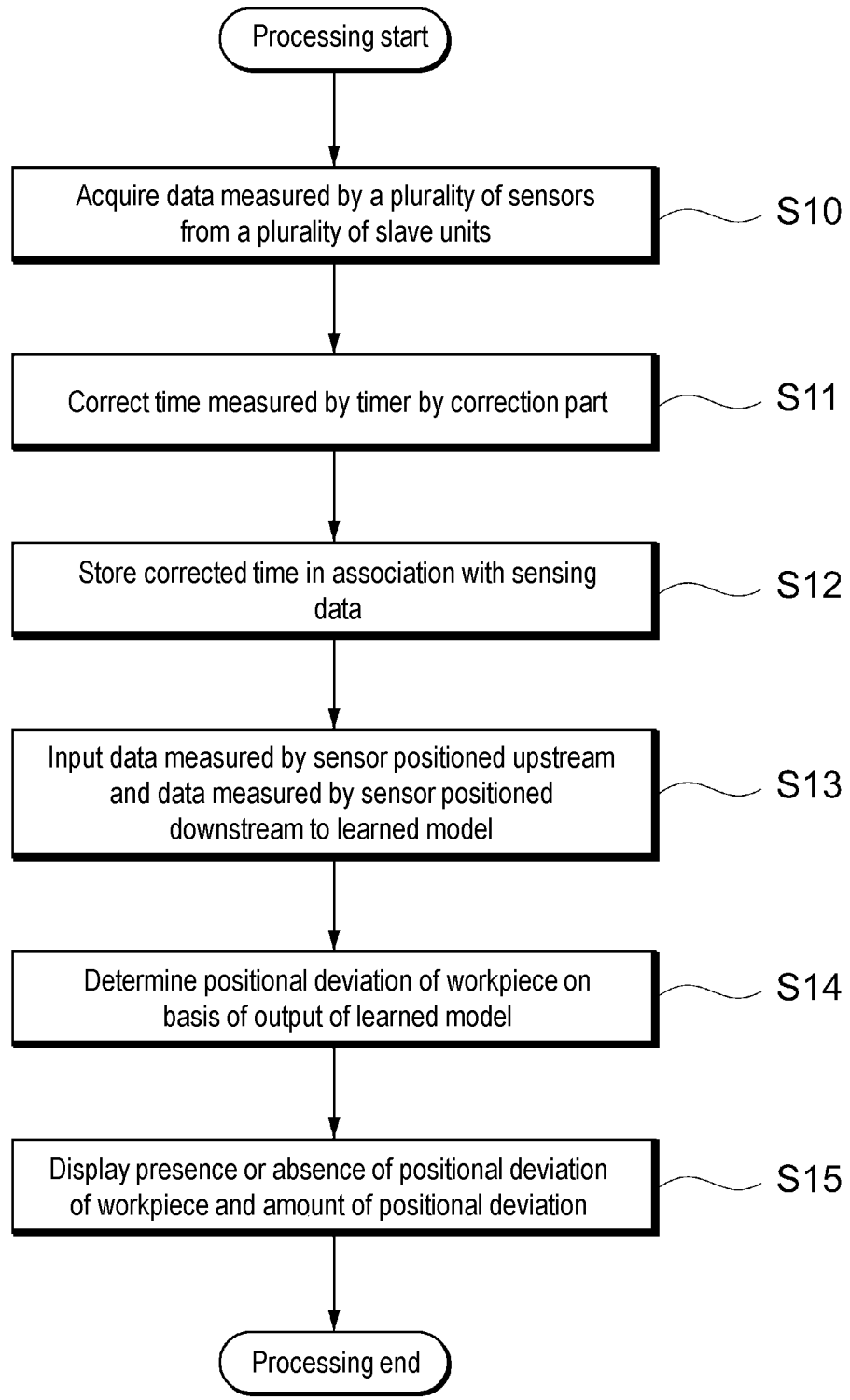
FIG. 6 is a flowchart of first processing executed by the master unit according to the present embodiment.

FIG. 6 is a flowchart of first processing executed by the master unit 10 according to the present embodiment. First, the master unit 10 acquires data measured by the plurality of sensors 30 from the plurality of slave units 20 (S10). Further, the time measured by the timer 12 is corrected by the correction part 13 (S11), and the corrected time is stored in association with sensing data (S12).

Thereafter, the master unit 10 input the data measured by the sensor positioned upstream and the data measured by the sensor positioned downstream to the learned model 14c (S13). Further, the master unit 10 determines a positional deviation of a workpiece on the basis of the output of the learned model 14c (S14). The master unit 10 does not necessarily have to perform determination using a learned model and may determine a positional deviation of a workpiece by calculating timings at which a workpiece has to pass through the detection ranges of the plurality of sensors 30 on the basis of the conveyance speed of the line L and the positions of the plurality of sensors 30 and comparing a deviation between the data measured by the sensor positioned upstream and the data measured by the sensor positioned downstream at the timing at which a workpiece has to pass by to the threshold.

Lastly, the master unit 10 causes the display part 16 to display the presence or absence of a positional deviation of a workpiece and the amount of the positional deviation (S15). The master unit 10 may cause the display part 16 to display an assumed place where an abnormality is present in the conveyance apparatus of the line L. The presence or absence of a positional deviation of a workpiece may be output by sound. In addition, the amount of a positional deviation of a workpiece and an abnormal place in the conveyance apparatus may be transmitted to the PLC 40.

Figure 7:
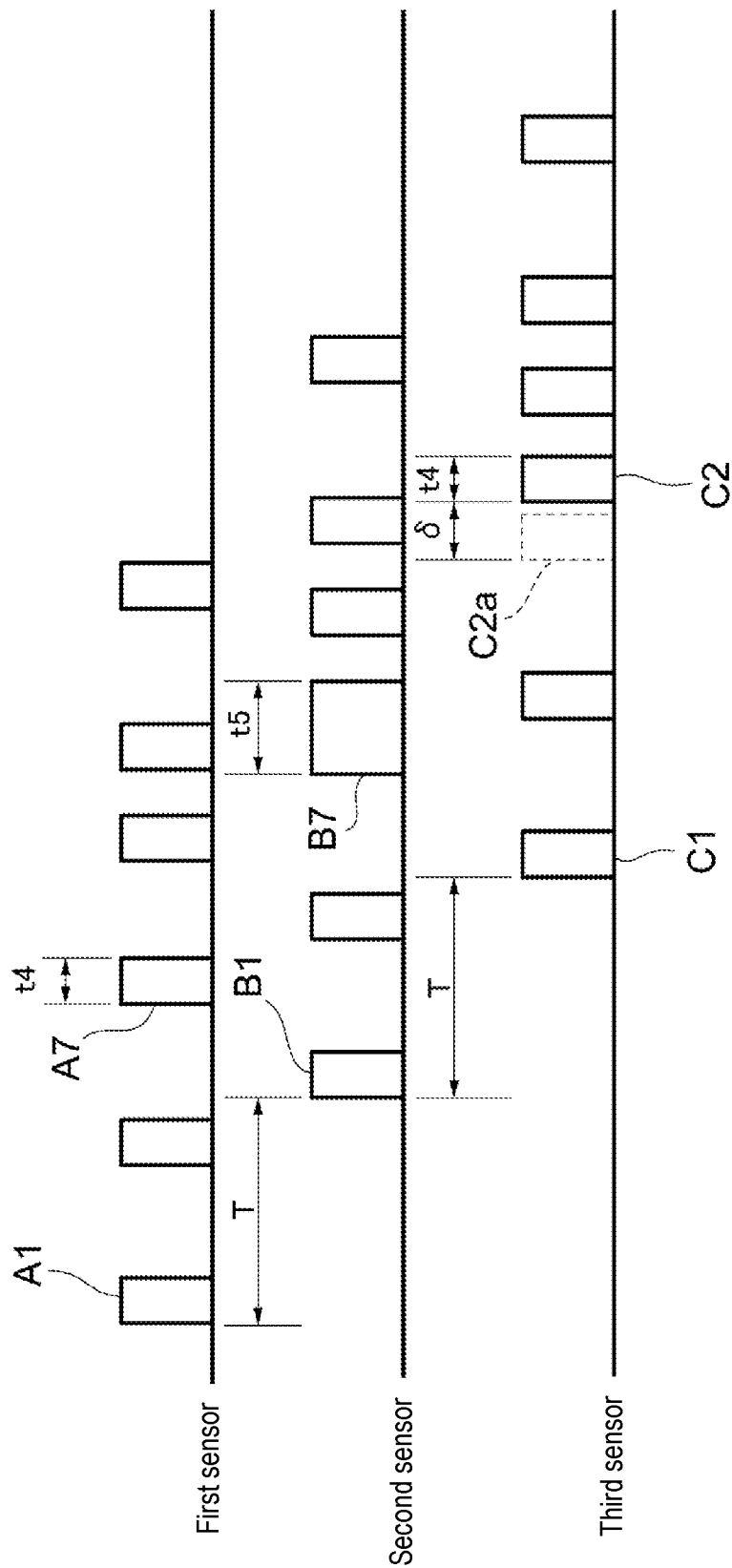
FIG. 7 is a diagram showing a third example of data measured by the sensor system according to the present embodiment.

FIG. 7 is a diagram showing a third example of data measured by the sensor system 1 according to the present embodiment. In this example, the positions of the first sensor 30a, the second sensor 30b, and the third sensor 30c are similar to those in the first example shown in FIG. 4. This example shows data which is measured when there is an abnormality in the line L at the place where the second sensor 30b is installed and the conveyance speed of the workpiece is temporarily delayed.

The data measured by the first sensor 30a includes the first data A1 and seventh data A7. Each of the first data A1 and the seventh data A7 is data indicating a passing state of a workpiece and is an on signal output when a workpiece is within the detection range of the first sensor 30a. Here, an on time period of the seventh data A7 is t4.

The data measured by the second sensor 30b includes the first data B1 and a seventh data B7. Each of the first data B1 and the seventh data B7 is data indicating a passing state of a workpiece and is an on signal output when a workpiece is within the detection range of the second sensor 30b. Here, compared to the first data A1 measured by the first sensor 30a, the first data B1 measured by the second sensor 30b is delayed by the time T. The time T is a value obtained by dividing the distance between the first sensor 30a and the second sensor 30b by the conveyance speed of the line L.

On the other hand, an on time period of seventh data B7 measured by the second sensor 30b is t5, and the on time period is longer than the seventh data A7 measured by the first sensor 30a.

The determination part 15 may determine a change in the conveyance speed of the workpiece on the basis of a difference between the time period during which a workpiece is detected by the sensor positioned upstream in the line L and the time period during which a workpiece is detected by the sensor positioned downstream in the line L. In the case of this example, if the line L operates normally, the on time period t4 of the seventh data A7 measured by the first sensor 30a positioned upstream in the line L and the on time period t5 of the seventh data B7 measured by the second sensor 30b positioned downstream in the line L ought to be equivalent to each other. In consideration of the delay of the time T, the determination part 15 detects there is a difference between the on time period of the seventh data A7 measured by the first sensor 30a positioned upstream in the line L and the on time period of the seventh data B7 measured by the second sensor 30b positioned downstream in the line L. When the difference is equal to or greater than the threshold, the determination part 15 may determine that there is a change in the conveyance speed of the workpiece.

In this manner, since the time period during which a workpiece is detected by the sensor positioned upstream in the line L and the time period during which a workpiece is detected by the sensor positioned downstream in the line L are compared to each other, it is possible to determine whether the conveyance speed of the workpiece has changed.

The data measured by the third sensor 30c includes the first data C1 and the second data C2. Each of the first data C1 and the second data C2 is data indicating a passing state of a workpiece and is an on signal output when a workpiece is within the detection range of the third sensor 30c. Here, compared to the first data B1 measured by the second sensor 30b, the first data C1 measured by the third sensor 30c is delayed by the time T.

On the other hand, compared to the seventh data A7 measured by the first sensor 30a, the second data C2 measured by the third sensor 30c is delayed by the time $2T+\delta$. In FIG. 7, the waveform C2a which appears when the second data C2 is measured in a manner of being delayed by the time 2T is indicated by a dotted line. Here, an on time period of the second data C2 measured by the third sensor 30c is t4 and is the same as the on time period of the seventh data A7 measured by the first sensor 30a. In addition, $t5=t4+\delta$ is established.

In consideration of the delay of the time T, the determination part 15 detects that there is a difference of $\delta$ between the seventh data A7 measured by the first sensor 30a positioned upstream in the line L and the second data C2 measured by the third sensor 30c positioned downstream in the line L. When $\delta$ is equal to or greater than the threshold, the determination part 15 may determine that a positional deviation of a workpiece has occurred.

In this manner, when the on time period of the data measured by the second sensor 30b deviates with respect to the on time period of the data measured by the first sensor 30a, the determination part 15 may determine that an abnormality is present in the conveyance apparatus of the line L at the place where the second sensor 30b is installed. In addition, when the on time period of the data measured by the third sensor 30c is approximately the same as the on time period of the data measured by the first sensor 30a, and when the sum of the deviation and the on time period in the data measured by the third sensor 30c is approximately the same as the on time period of the data measured by the second sensor 30b, the determination part 15 may determine that an abnormality is not present in the conveyance apparatus of the line L between the place where the second sensor 30b is installed and the place where the third sensor 30c is installed.

The determination part 15 may input the time period during which a workpiece is detected by the first sensor 30a, the second sensor 30b, and the third sensor 30c to the learned model 14c and determine a change in the conveyance speed of the workpiece on the basis of the output of the learned model 14c. In such a case, the determination part 15 may determine a change amount of the conveyance speed of the workpiece by means of the learned model 14c.

Figure 8:
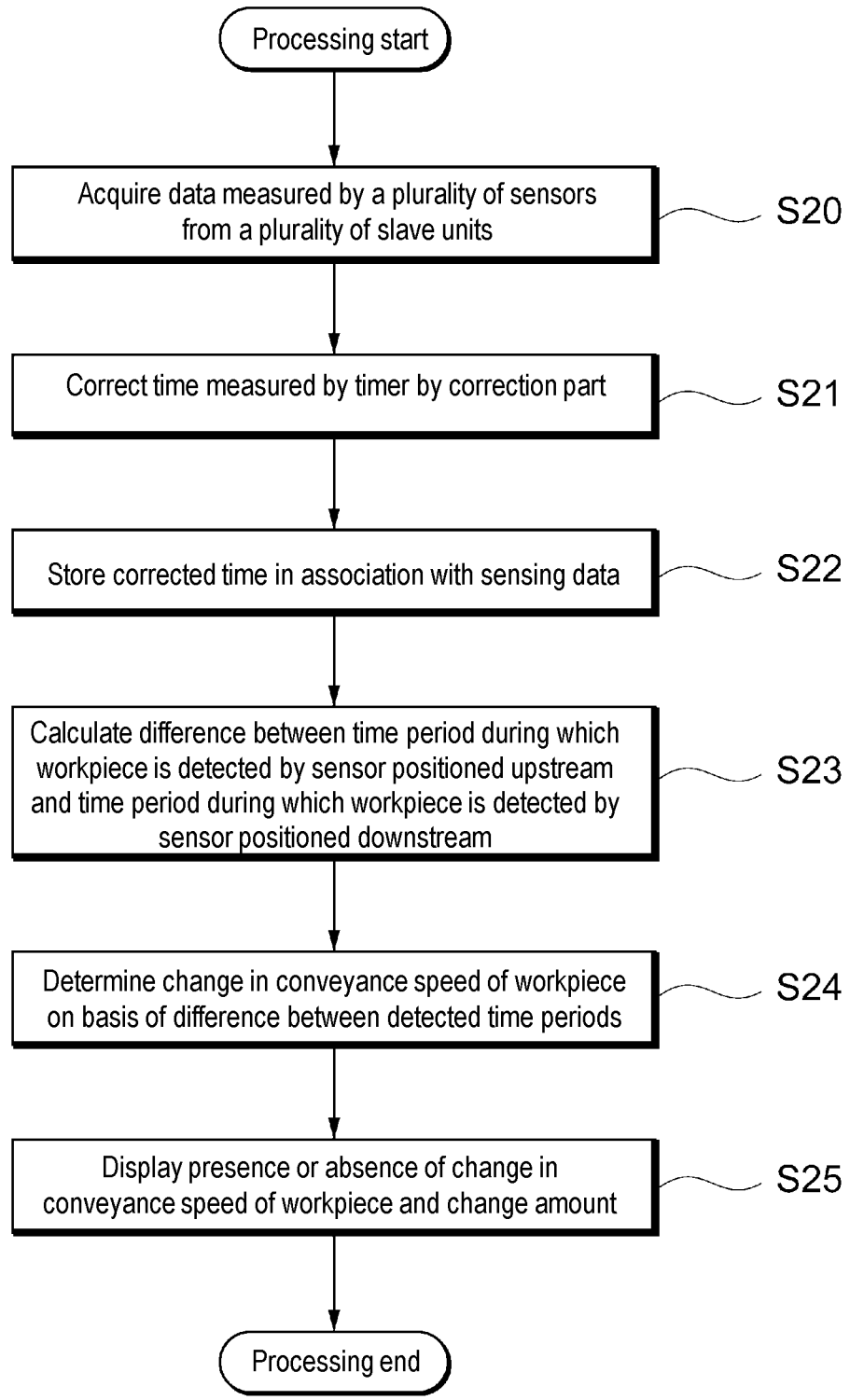
FIG. 8 is a flowchart of second processing executed by the master unit according to the present embodiment.

FIG. 8 is a flowchart of second processing executed by the master unit 10 according to the present embodiment. First, the master unit 10 acquires data measured by the plurality of sensors 30 from the plurality of slave units 20 (S20). Further, the time measured by the timer 12 is corrected by the correction part 13 (S21), and the corrected time is stored in association with sensing data (S22).

Thereafter, the master unit 10 calculates the difference between the time period during which a workpiece is detected by the sensor positioned upstream and the time period during which a workpiece is detected by the sensor positioned downstream (S23). Further, the master unit 10 determines a change in the conveyance speed of the workpiece on the basis of the difference between the detected time periods (S24). The master unit 10 may input the time period during which a workpiece is detected by the sensor positioned upstream and the time period during which a workpiece is detected by the sensor positioned downstream to the learned model and determine the presence or absence of an abnormality which relates to the line on the basis of the output of the learned model.

Lastly, the master unit 10 causes the display part 16 to display the presence or absence of a change in the conveyance speed of the workpiece and the change amount (S25). The master unit 10 may cause the display part 16 to display an assumed place where an abnormality is present in the conveyance apparatus of the line L. The presence or absence of a change in the conveyance speed of the workpiece may be output by sound. In addition, a change in the conveyance speed of the workpiece and the change amount may be transmitted to the PLC 40.

Figure 9:
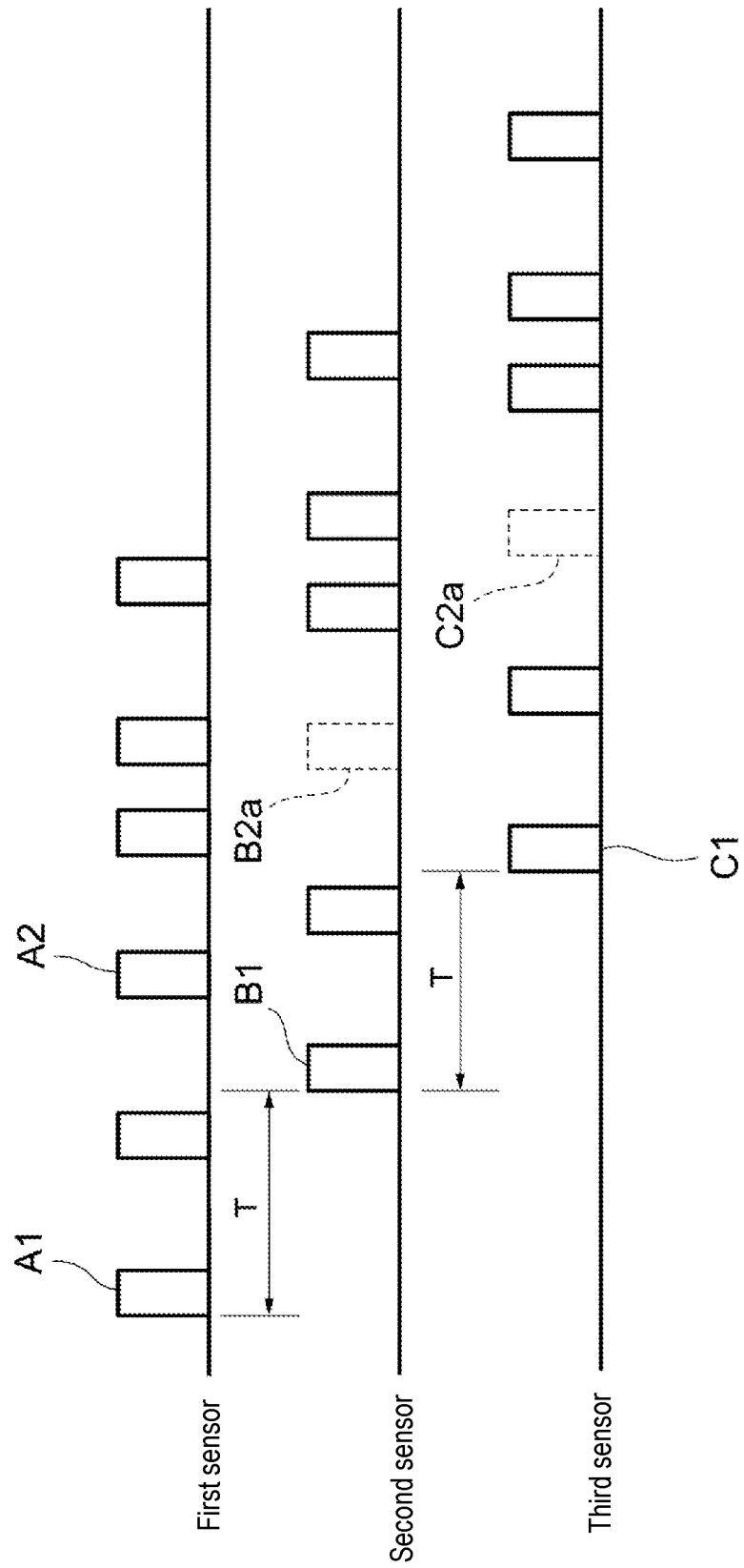
FIG. 9 is a diagram showing a fourth example of data measured by the sensor system according to the present embodiment.

FIG. 9 is a diagram showing a fourth example of data measured by the sensor system 1 according to the present embodiment. In this example, the positions of the first sensor 30a, the second sensor 30b, and the third sensor 30c are similar to those in the first example shown in FIG. 4. This example shows data which is measured when there is an abnormality in the line L between the place where the first sensor 30a is installed and the place where the second sensor 30b is installed and a workpiece has fallen.

The data measured by the first sensor 30a includes the first data A1 and the second data A2. Each of the first data A1 and the second data A2 is data indicating a passing state of a workpiece and is an on signal output when a workpiece is within the detection range of the first sensor 30a.

The data measured by the second sensor 30b includes the first data B1. The first data B1 is data indicating a passing state of a workpiece and is an on signal output when a workpiece is within the detection range of the second sensor 30b. Here, compared to the first data A1 measured by the first sensor 30a, the first data B1 measured by the second sensor 30b is delayed by the time T. The time T is a value obtained by dividing the distance between the first sensor 30a and the second sensor 30b by the conveyance speed of the line L.

On the other hand, the data measured by the second sensor 30b includes no data corresponding to the second data A2. In FIG. 9, the waveform B2a which appears when data corresponding to the second data A2 is measured in a manner of being delayed by the time T is indicated by a dotted line.

The determination part 15 may determine falling of a workpiece on the basis of a correspondence relationship between the data measured by the sensor positioned upstream in the line L and the data measured by the sensor positioned downstream in the line L. In the case of this example, if the line L operates normally, data corresponds to the waveform B2a ought to be measured by the second sensor 30b positioned downstream in the line L in a manner of corresponding to the second data A2 measured by the first sensor 30a positioned upstream in the line L. In consideration of the delay of the time T, the determination part 15 detects the correspondence relationship between the second data A2 measured by the first sensor 30a positioned upstream in the line L and the data measured by the second sensor 30b positioned downstream in the line L. When the data corresponding to the second data A2 is not measured by the second sensor 30b, the determination part 15 may determine that falling of a workpiece has occurred. Falling of a workpiece includes not only a case in which a workpiece has fallen from the line L but also a case in which a workpiece is conveyed in a lying manner and a case in which a workpiece is conveyed in an abnormal posture.

In this manner, when the data measured by the sensor positioned upstream in the line L and the data measured by the sensor positioned downstream in the line L do not correspond to each other in a one-to-one manner, it is possible to determine that falling of a workpiece has occurred.

The data measured by the third sensor 30c includes the first data C1. The first data C1 is data indicating a passing state of a workpiece and is an on signal output when a workpiece is within the detection range of the third sensor 30c. Here, compared to the first data B1 measured by the second sensor 30b, the first data C1 measured by the third sensor 30c is delayed by the time T.

On the other hand, the data measured by the third sensor 30c includes no data corresponding to the second data A2. In FIG. 9, the waveform C2a which appears when data corresponding to the second data A2 is measured in a manner of being delayed by the time 2T is indicated by a dotted line.

In consideration of the delay of the time 2T, the determination part 15 may detect that the second data A2 measured by the first sensor 30a positioned upstream in the line L and the second data C2 measured by the third sensor 30c positioned downstream in the line L do not correspond to each other in a one-to-one manner and determine that falling of a workpiece has occurred.

In this manner, when the number of on signals of the data measured by the second sensor 30b is fewer than the number of on signals of the data measured by the first sensor 30a, the determination part 15 may determine that a workpiece has fallen between the place where the first sensor 30a is installed and the place where the second sensor 30b is installed. In addition, when the number of on signals of the data measured by the third sensor 30c is equivalent to the number of on signals of the data measured by the second sensor 30b, the determination part 15 may determine that an abnormality is not present in the conveyance apparatus of the line L between the place where the second sensor 30b is installed and the place where the third sensor 30c is installed.

The determination part 15 may input the time period during which a workpiece is detected by the first sensor 30a, the second sensor 30b, and the third sensor 30c to the learned model 14c and determine falling of a workpiece on the basis of the output of the learned model 14c. In such a case, the determination part 15 may determine the place where falling of a workpiece has occurred in the line L by means of the learned model 14c.

Figure 10:
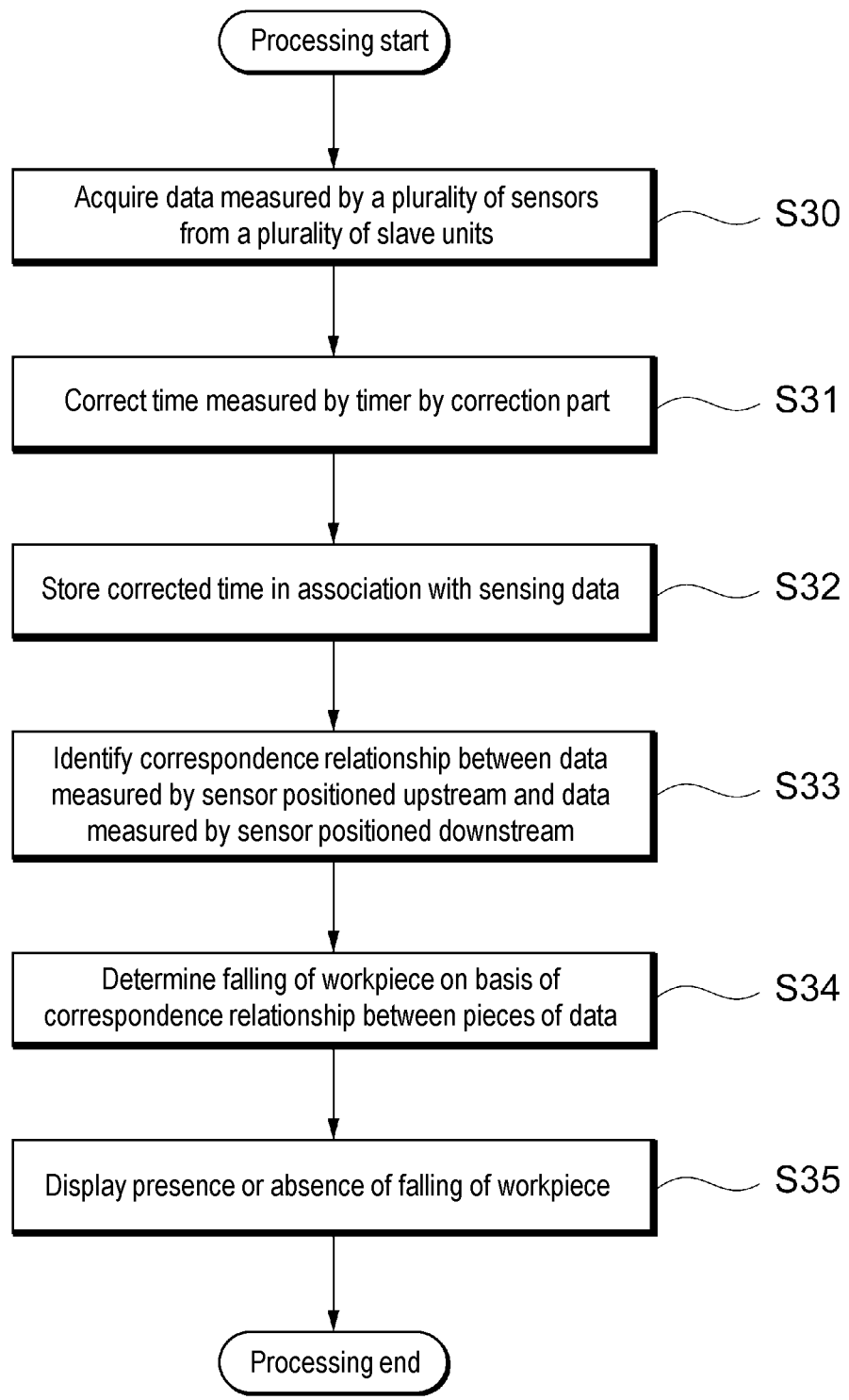
FIG. 10 is a flowchart of third processing executed by the master unit according to the present embodiment.

FIG. 10 is a flowchart of third processing executed by the master unit 10 according to the present embodiment. First, the master unit 10 acquires data measured by the plurality of sensors 30 from the plurality of slave units 20 (S30). Further, the time measured by the timer 12 is corrected by the correction part 13 (S31), and the corrected time is stored in association with sensing data (S32).

Thereafter, the master unit 10 identifies the correspondence relationship between the data measured by the sensor positioned upstream and the data measured by the sensor positioned downstream (S33). Further, the master unit 10 determines falling of a workpiece on the basis of the correspondence relationship between the pieces of data (S34). The master unit 10 may input the data measured by the sensor positioned upstream and the data measured by the sensor positioned downstream to the learned model and determine falling of a workpiece on the basis of the output of the learned model.

Lastly, the master unit 10 causes the display part 16 to display the presence or absence of falling of a workpiece (S35). The master unit 10 may cause the display part 16 to display an assumed place where an abnormality is present in the conveyance apparatus of the line L. The presence or absence of falling of a workpiece may be output by sound and may be transmitted to the PLC 40.

Figure 11:
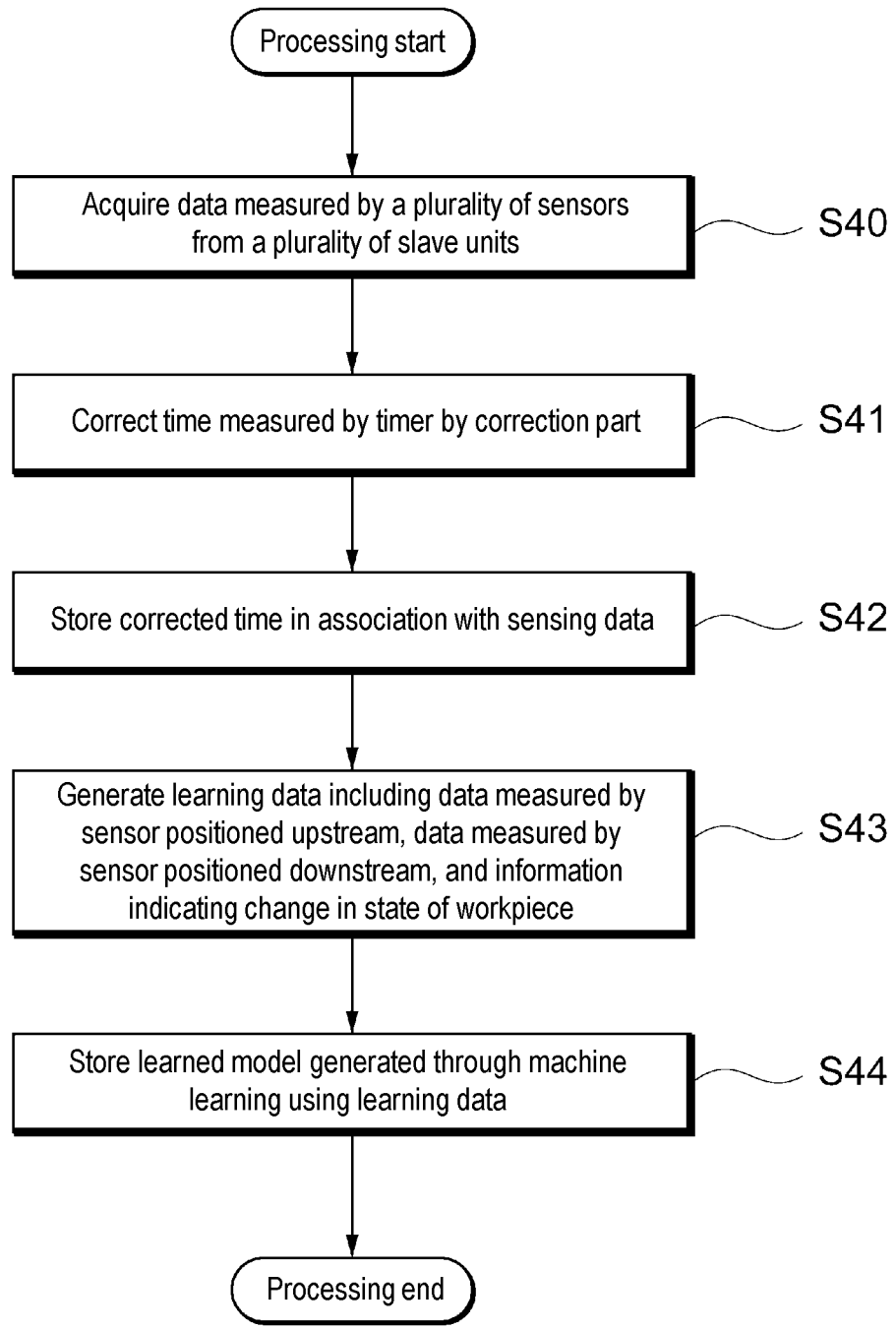
FIG. 11 is a flowchart of fourth processing executed by the master unit according to the present embodiment.

FIG. 11 is a flowchart of fourth processing executed by the master unit 10 according to the present embodiment. The processing shown in the same diagram is processing in which learning data is collected by the master unit 10 and a learned model is generated.

First, the master unit 10 acquires data measured by the plurality of sensors 30 from the plurality of slave units 20 (S40). Further, the time measured by the timer 12 is corrected by the correction part 13 (S41), and the corrected time is stored in association with sensing data (S42).

Thereafter, the master unit 10 generates learning data including the data measured by the sensor positioned upstream, the data measured by the sensor positioned downstream, and information indicating a change in state of a workpiece (S43). Further, the master unit 10 stores the learned model generated through machine learning using the learning data (S44). Machine learning of a learning model using the learning data may be executed by the master unit 10 or may be executed by a different device.

Figure 12:
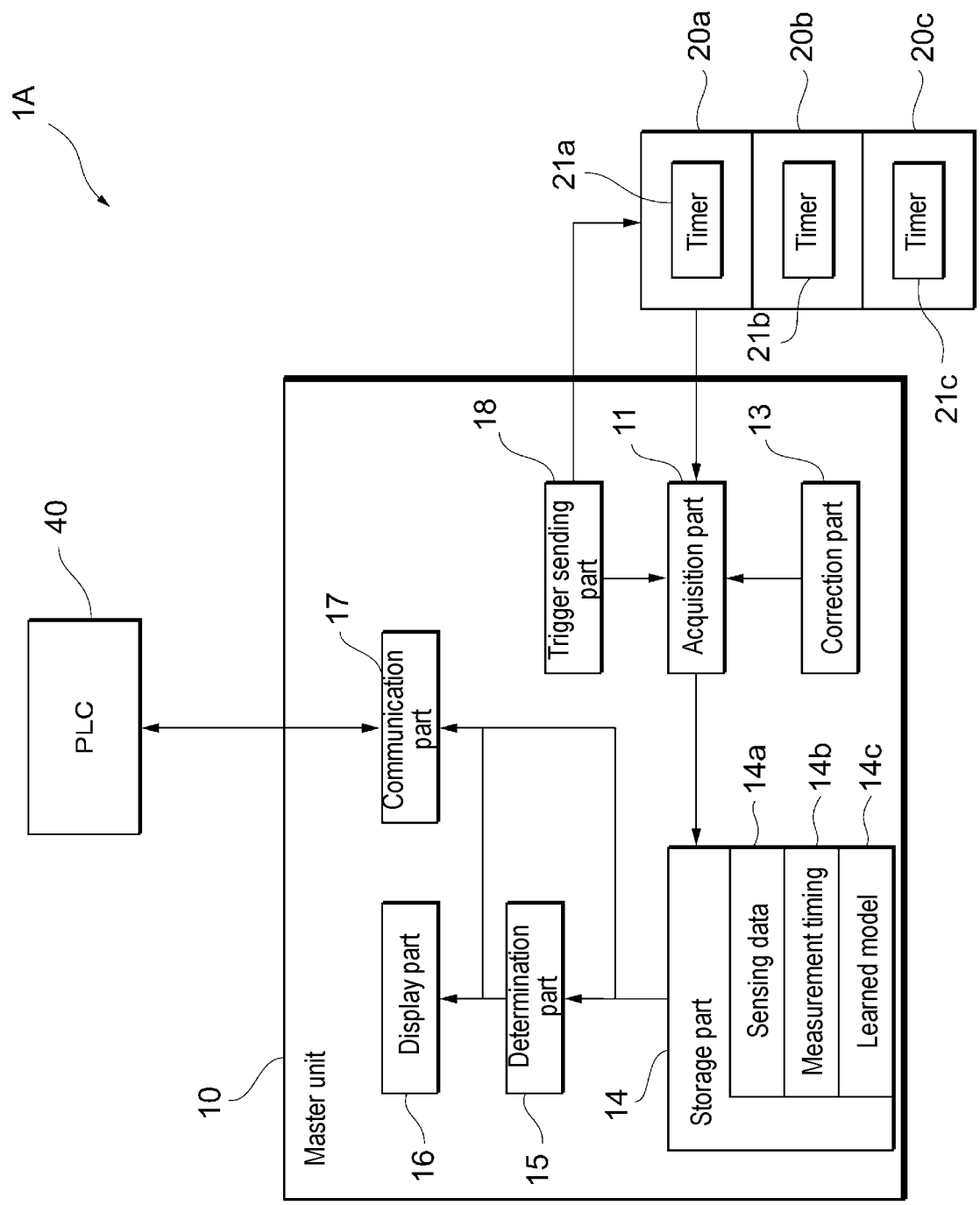
FIG. 12 is a diagram showing a functional block of a sensor system according to a first modification example of the present embodiment.

FIG. 12 is a diagram showing a functional block of a sensor system 1A according to a first modification example of the present embodiment. The sensor system 1A according to the first modification example differs from the sensor system 1 in that the master unit 10 has no timer but has a trigger sending part 18, the first slave unit 20a has a timer 21a, the second slave unit 20b has a timer 21b, and the third slave unit 20c has a timer 21c. Regarding other configurations, the sensor system 1A according to the first modification example has configurations similar to those of the sensor system 1.

The trigger sending part 18 sends a trigger signal which serves as a time reference to the plurality of slave units 20. Here, any trigger signal may be adopted as long as it serves as a time reference.

The plurality of slave units 20 respectively have the timers 21a, 21b, and 21c. The elapsed times after reception of a trigger signal is measured by the timers 21a, 21b, and 21c, and the elapsed times are transmitted to the master unit 10 together with the data measured by the plurality of sensors 30. Further, the storage part 14 of the master unit 10 stores the elapsed times received from the plurality of slave units 20 in association with the data.

In this manner, without providing a timer in the master unit 10, the data measured by the plurality of sensors 30 can be stored in association with information which relates to the timing at which the data was measured.

Figure 13:
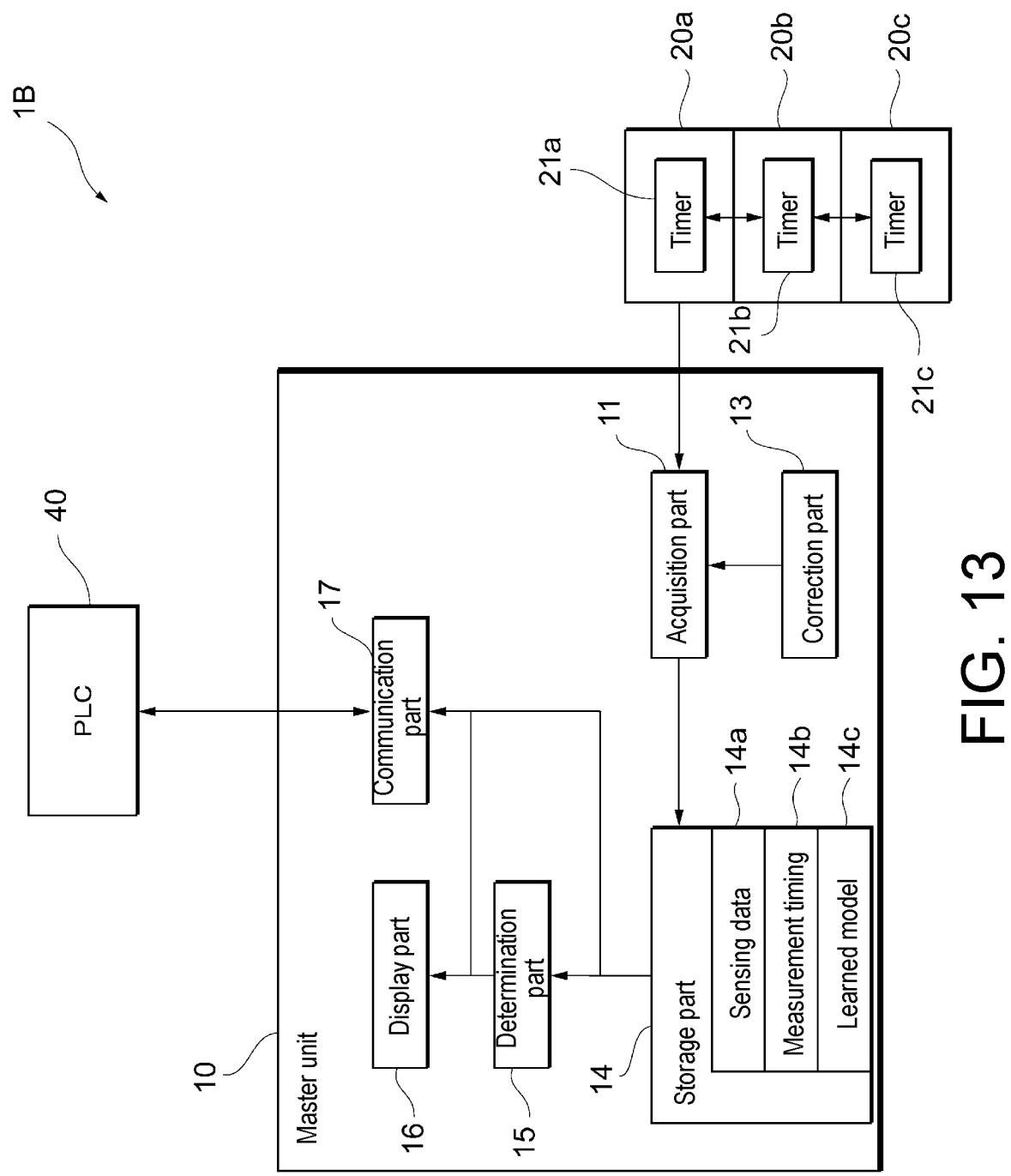
FIG. 13 is a diagram showing a functional block of a sensor system according to a second modification example of the present embodiment.

FIG. 13 is a diagram showing a functional block of a sensor system 1B according to a second modification example of the present embodiment. The sensor system 1B according to the second modification example differs from the sensor system 1 in that the master unit 10 has no timer, the first slave unit 20a has the timer 21a, the second slave unit 20b has the timer 21b, and the third slave unit 20c has the timer 21c. Regarding other configurations, the sensor system 1B according to the second modification example has configurations similar to those of the sensor system 1.

The plurality of slave units 20 respectively have the timers 21a, 21b, and 21c for performing synchronization between the plurality of slave units 20 and transmit the times measured by the timers 21a, 21b, and 21c together with the data measured by the plurality of sensors 30 to the master unit 10. Here, synchronization of the timers 21a, 21b, and 21c may be performed between adjacent slave units 20. The storage part 14 stores the times measured by the timers 21a, 21b, and 21c in association with the data.

In this manner, a processing load of the master unit 10 is reduced, and the data measured by the plurality of sensors 30 can be stored in association with information which relates to the timing at which the data was measured.

Figure 14:
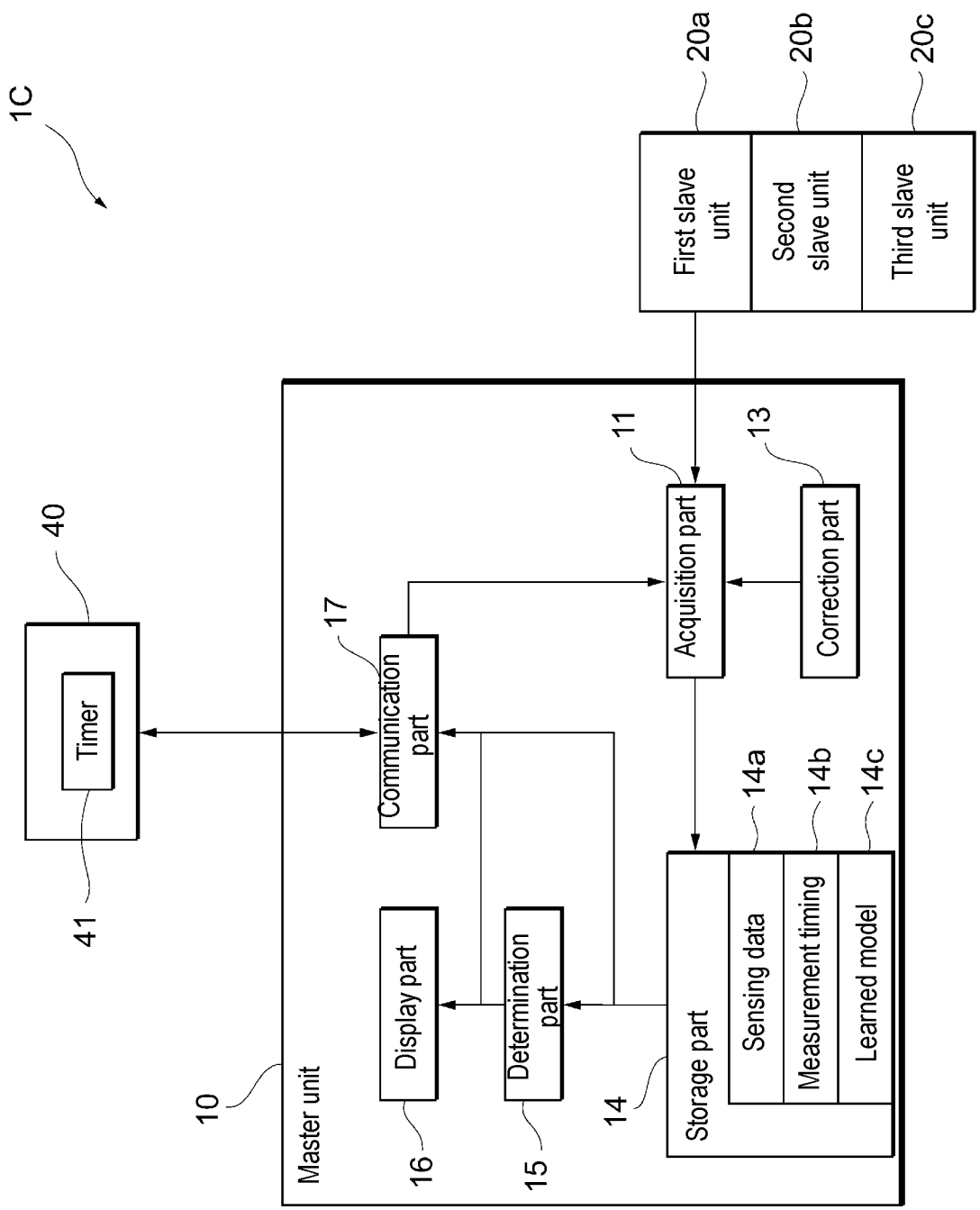
FIG. 14 is a diagram showing a functional block of a sensor system according to a third modification example of the present embodiment.

FIG. 14 is a diagram showing a functional block of a sensor system 1C according to a third modification example of the present embodiment. The sensor system 1C according to the third modification example differs from the sensor system 1 in that the master unit 10 has no timer and the PLC 40 has a timer 41. Regarding other configurations, the sensor system 1C according to the third modification example has configurations similar to those of the sensor system 1.

The master unit 10 has a reception part for receiving a signal which serves as a time reference from an external instrument. In the case of this modification example, the master unit 10 has the communication part 17 for receiving a signal which serves as a time reference from the PLC 40. A signal which serves as a time reference may be a time measured by the timer 41 of the PLC 40. The storage part 14 stores a time calculated on the basis of a signal which serves as a time reference in association with the data measured by the plurality of sensors 30.

Accordingly, without providing timers in the plurality of slave units 20 and the master unit 10, the data measured by the plurality of sensors 30 can be stored in association with information which relates to the timing at which the data was measured.

Figure 15:
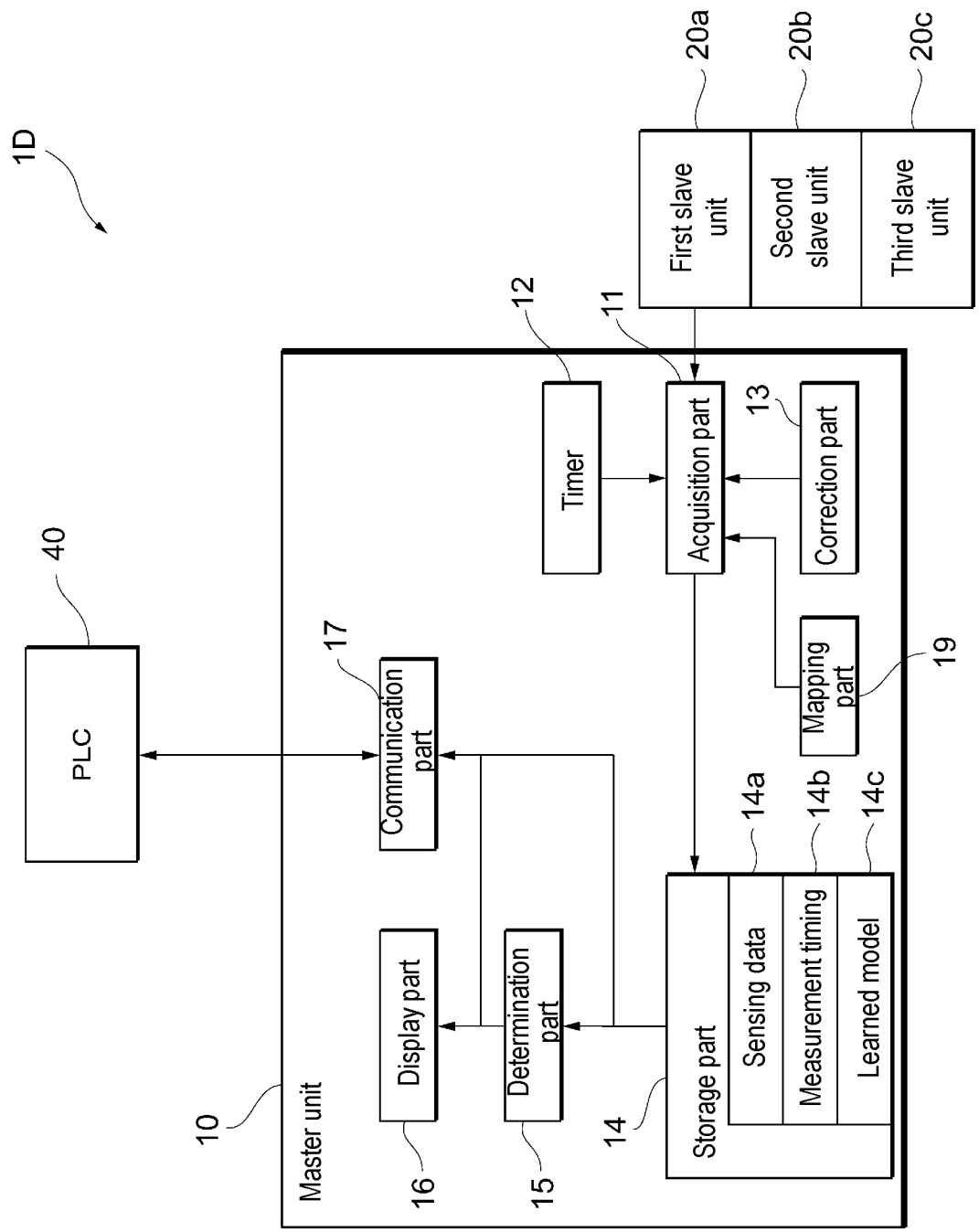
FIG. 15 is a diagram showing a functional block of a sensor system according to a fourth modification example of the present embodiment.

FIG. 15 is a diagram showing a functional block of a sensor system 1D according to a fourth modification example of the present embodiment. The sensor system 1D according to the fourth modification example differs from the sensor system 1 in that the master unit 10 has a mapping part 19. Regarding other configurations, the sensor system 1D according to the fourth modification example has configurations similar to those of the sensor system 1.

Data measured by the sensor system 1D according to the fourth modification example is time series data including rising waveforms or falling waveforms in accordance with the passing states of a workpiece being conveyed upon the line L. In this example, when a workpiece enters the detection range of the sensor 30, a rising waveform is output as sensing data, and when a workpiece escapes from the detection range of the sensor 30, a falling waveform is output as sensing data.

The mapping part 19 performs mapping of rising waveforms or falling waveforms acquired by two or more of the plurality of slave units 20 regarding the same workpiece on the basis of the intervals of the rising waveforms or the intervals of the falling waveforms included in the time series data acquired by the two or more slave units. Since the rising waveforms or the falling waveforms acquired by two or more slave units are mapped by the mapping part 19 regarding the same workpiece, the time series data measured by the plurality of sensors 30 can be appropriately compared to each other, and thus it is possible to appropriately determine a change in state of a workpiece being conveyed upon the line L.

Figure 16:
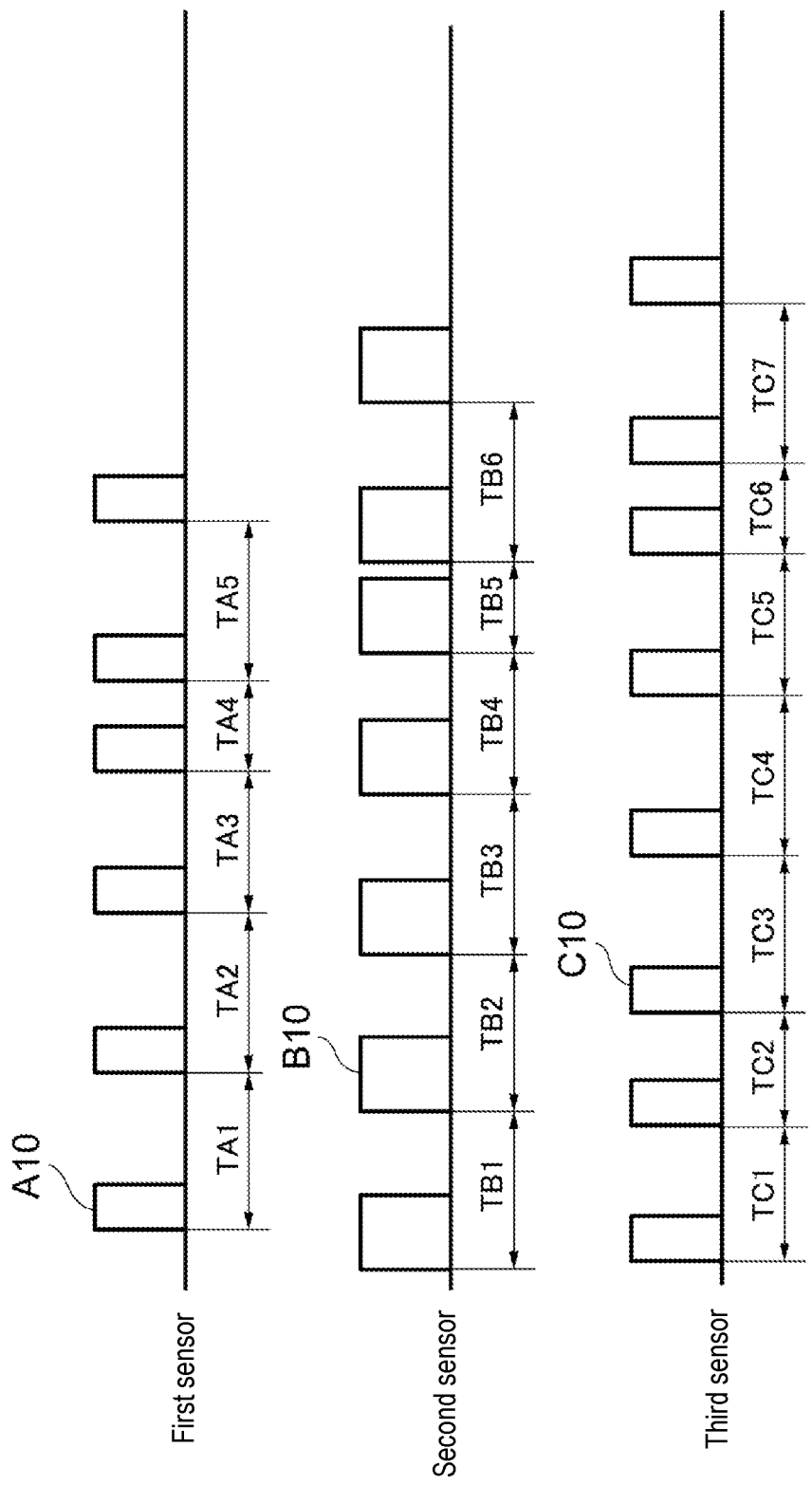
FIG. 16 is a diagram showing a fifth example of data measured by the sensor system according to the fourth modification example of the present embodiment.

FIG. 16 is a diagram showing a fifth example of data measured by the sensor system 1D according to the fourth modification example of the present embodiment. In this example, the positions of the first sensor 30a, the second sensor 30b, and the third sensor 30c are similar to those in the first example shown in FIG. 4. In this example, the conveyance speed of the line L is temporarily delayed at the place where the second sensor 30b is installed, and the width of the waveform measured when a workpiece passes through the detection range of the second sensor 30b is larger than the width of the waveform measured when a workpiece passes through the detection ranges of the first sensor 30a and the third sensor 30c. In this example, the conveyance speed of the line L which is temporarily delayed at the place where the second sensor 30b is installed is regarded as normal.

The data measured by the first sensor 30a includes six rectangular waves which have been output when a workpiece passes through the detection range of the first sensor 30a, and each thereof includes rising waveforms and falling waveforms. The six rectangular waves respectively correspond to different workpieces. In this example, the rising waveforms and the falling waveforms are expressed substantially by straight vertical lines, but curves may actually be adopted.

The mapping part 19 may perform mapping of rising waveforms or falling waveforms acquired by the first slave unit 20a and rising waveforms or falling waveforms acquired by the second slave unit 20b such that the average value of differences between the intervals of the rising waveforms or the intervals of the falling waveforms acquired by the first slave unit 20a of the plurality of slave units 20 and the intervals of the rising waveforms or the intervals of the falling waveforms acquired by the second slave unit 20b of the plurality of slave units 20 decreases.

In this example, the intervals of the rising waveforms acquired by the first slave unit 20a are TA1, TA2, TA3, TA4, and TA5. In addition, the intervals of the rising waveforms acquired by the second slave unit 20b are TB1, TB2, TB3, TB4, TB5, and TB6. Further, the average value of the differences between the intervals of the rising waveforms may be |TA1−TB6|, may be (|TA1−TB5|+|TA2−TB6|)/2, may be (|TA1−TB4|+|TA2−TB5|+|TA3−TB6|)/3, may be (|TA1−TB3|+|TA2−TB4|+|TA3−TB5|+|TA4−TB6|)/4, and may be (|TA1−TB2|+|TA2−TB3|+|TA3−TB4|+|TA4−TB5|+|TA5−TB6|)/5. In this manner, the mapping part 19 calculates the differences between the intervals of the rising waveforms or the falling waveforms measured by two sensors 30 and searches for a combination such that the average value thereof decreases. In the case of this example, since (|TA1−TB2|+|TA2−TB3|+|TA3−TB4|+|TA4−TB5|+|TA5−TB6|)/5 becomes the smallest, the mapping part 19 performs mapping of the rising waveform of tenth data A10 measured by the first sensor 30a and the rising waveform of tenth data B10 measured by the second sensor 30b and sequentially performs mapping of the rising waveforms measured thereafter.

Similarly, the intervals of the rising waveforms acquired by the third slave unit 20c are TC1, TC2, TC3, TC4, TC5, TC6, and TC7. Further, the average value of the differences between the intervals of the falling waveforms acquired by the first slave unit 20a and the intervals of the rising waveforms acquired by the third slave unit 20c may be |TA1−TC7|, may be (|TA1−TC6|+|TA2−TC7|)/2, may be (|TA1−TC5|+|TA2−TC6|+|TA3−TC7|)/3, may be (|TA1−TC4|+|TA2−TC5|+|TA3−TC6|+|TA4−TC7|)/4, and may be (|TA1−TC3|+|TA2−TC4|+|TA3−TC5|+|TA4−TC6|+|TA5−TC7|)/5. In the case of this example, since (|TA1−TC3|+|TA2−TC4|+|TA3−TC5|+|TA4−TC6|+|TA5−TC7|)/5 becomes the smallest, the mapping part 19 performs mapping of the rising waveform of the tenth data A10 measured by the first sensor 30a and the rising waveform of tenth data C10 measured by the third sensor 30c and sequentially performs mapping of the rising waveforms measured thereafter.

In this manner, since the average value of the differences between the intervals of the rising waveforms or the falling waveforms measured by two sensors 30 is adopted as an evaluation value, even when the conveyance speed of the line L temporarily becomes slower or faster, the time series data measured by two sensors 30 can be mapped appropriately.

Since mapping of rising waveforms or falling waveforms can be performed, the master unit 10 can also calculate a time at which a workpiece passes by a section between two sensors 30. In addition, the master unit 10 causes the display part 16 to display the calculated passing time such that a user confirms the appropriateness thereof, thereby allowing the user to confirm the appropriateness of mapping of rising waveforms or falling waveforms. Moreover, when the positional interval between two sensors 30 is already known, the master unit 10 can calculate the average conveyance speed of the line L and cause the display part 16 to display the calculated result, thereby allowing a user to confirm the appropriateness thereof. In contrast, the master unit 10 may receive an input of an approximate value for the time at which a workpiece passes by a section between two sensors 30 from a user in advance and limit the combinations for calculating the average value of the differences between the intervals of the rising waveforms or the falling waveforms by the mapping part 19. Accordingly, a computation load can be reduced. In addition, the master unit 10 can also calculate a local conveyance speed of the line L on the basis of the widths of the waveforms when the same workpiece is measured by the plurality of sensors 30. Accordingly, regarding two sensors 30 positioned side by side in order, a time from when a workpiece is detected by the sensor 30 on the upstream side to when the workpiece is detected by the sensor 30 on the downstream side can be estimated, and thus a difference between the estimated time and the actual measurement time can also be calculated.

The mapping part 19 may perform mapping of rising waveforms or falling waveforms regarding some slave units selected from the plurality of slave units 20. In the case of this example, the mapping part 19 may perform mapping of rising waveforms or falling waveforms regarding two selected slave units of the first slave unit 20a, the second slave unit 20b, and the third slave unit 20c. In this manner, since a slave unit 20 for executing mapping is selected, it is possible to omit mapping of data which is not certainly necessary and reduce a processing load.

In addition, when the first sensor 30a connected to the first slave unit 20a is positioned upstream in the line L from the second sensor 30b connected to the second slave unit 20b, the mapping part 19 may perform mapping of rising waveforms or falling waveforms acquired by the first slave unit 20a and rising waveforms or falling waveforms acquired by the second slave unit 20b such that the average value of the differences between the intervals of the rising waveforms or the intervals of the falling waveforms acquired by the first slave unit 20a and the intervals of the rising waveforms or the intervals of the falling waveforms acquired thereafter by the second slave unit 20b decreases. In other words, the mapping part 19 may perform mapping of rising waveforms or falling waveforms acquired by the first slave unit 20a and rising waveforms or falling waveforms acquired by the second slave unit 20b such that the average value of the differences between the intervals of the rising waveforms or the falling waveforms measured by the first sensor 30a and the intervals of the rising waveforms or the falling waveforms measured by the second sensor 30b after the measurement timing of the first sensor 30a decreases.

Specifically, the mapping part 19 does not need to evaluate whether the value is (|TA2|TB1|+|TA3−TB2|+|TA4−TB3|+|TA5−TB4|)/4, (|TA3−TB1|+|TA4−TB2|+|TA5−TB3|)/3, (|TA4−TB1|+|TA5−TB2|)/2, or |TA5−TB1|, and the average value of these may not be calculated. In addition, the mapping part 19 does not need to evaluate whether the value is (|TA2−TC1|+|TA3−TC2|+|TA4−TC3|+|TA5−TC4|)/4, (|TA3−TC1|+|TA4−TC2−+|TA5−TC3|)/3, (|TA4−TC1|+|TA5−TC2|)/2, or |TA5−TC1|, and the average value of these may not be calculated.

In this manner, since a combination of average values which have to be calculated in accordance with the positions of the plurality of sensors 30 is limited, it is possible to reduce a computation load.

In addition, the mapping part 19 may perform mapping of rising waveforms or falling waveforms acquired by the first slave unit 20a and rising waveforms or falling waveforms acquired by the second slave unit 20b from combinations in which the number of items for calculating the average value becomes a predetermined number or larger. For example, the mapping part 19 may perform mapping of rising waveforms or falling waveforms acquired by the first slave unit 20a and rising waveforms or falling waveforms acquired by the second slave unit 20b from the combinations in which the number of items for calculating an average value becomes 3 or larger.

Accordingly, it is possible to reduce a probability of erroneous mapping of rising waveforms or falling waveforms, and thus it is possible to perform more appropriate mapping.

There may be a case in which the average values of the differences between the intervals of the rising waveforms or the falling waveforms measured by two sensors 30 become equivalent to each other in different combinations for calculating a difference. For example, the values of (|TA1−TB5|+|TA2−TB6|)/2 and (|TA1−TB4|+|TA2−TB5|+|TA3−TB6|)/3 may be equivalent to each other. In such a case, the mapping part 19 may perform mapping of rising waveforms or falling waveforms acquired by the first slave unit 20a and rising waveforms or falling waveforms acquired by the second slave unit 20b such that the number of items for calculating an average value increases. That is, in the foregoing example, the rising waveforms or the falling waveforms acquired by the first slave unit 20a and the rising waveforms or the falling waveforms acquired by the second slave unit 20b may be mapped by employing (|TA1−TB4|+|TA2−TB5|+|TA3−TB6|)/3.

In this manner, it is possible to improve the reliability of mapping by prioritizing mapping using a large amount of data.

Figure 17:
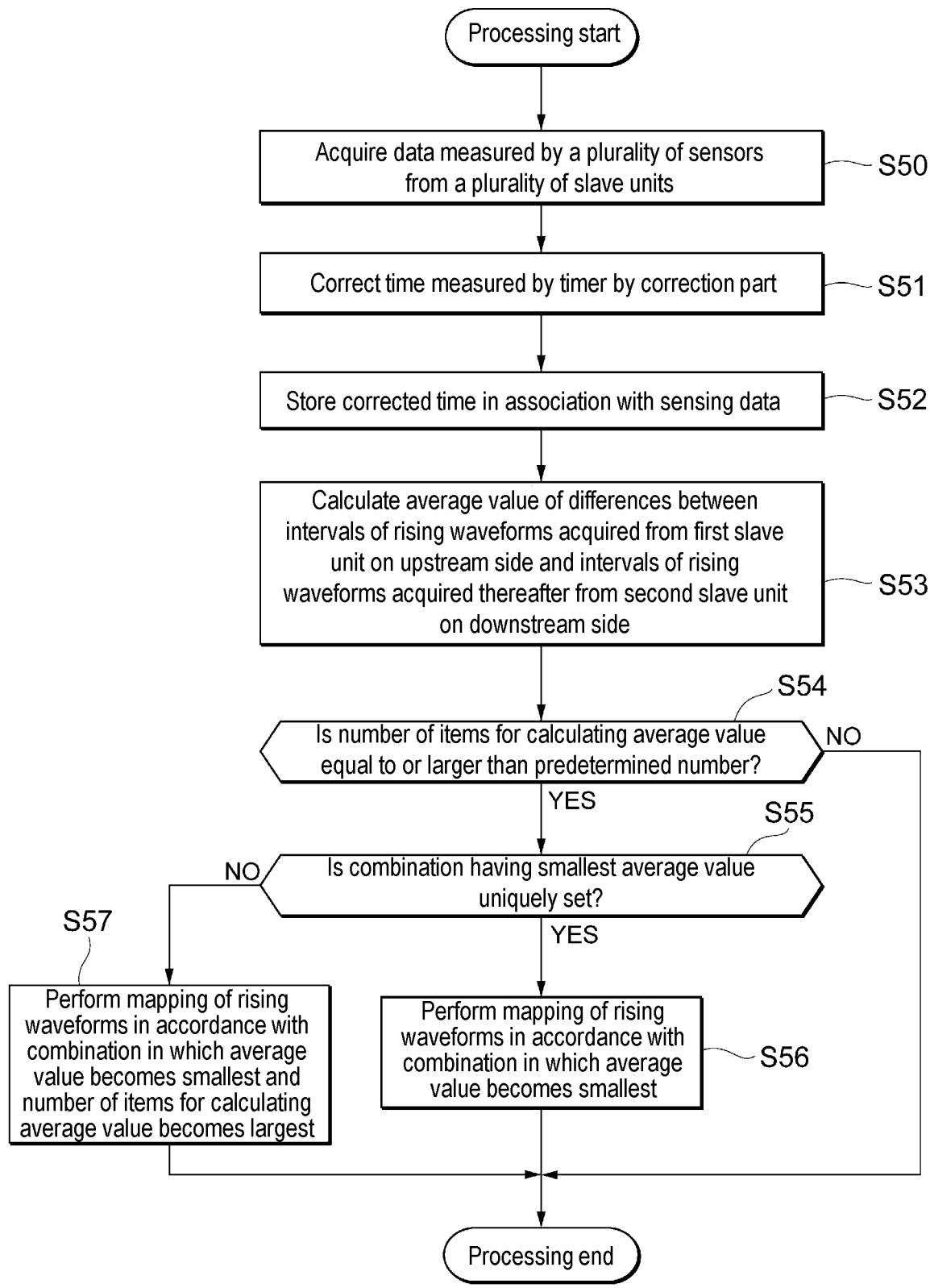
FIG. 17 is a flowchart of fifth processing executed by the master unit according to the fourth modification example of the present embodiment.

FIG. 17 is a flowchart of fifth processing executed by the master unit 10 according to the fourth modification example of the present embodiment. First, the master unit 10 acquires data measured by the plurality of sensors 30 from the plurality of slave units 20 (S50). Further, the time measured by the timer 12 is corrected by the correction part 13 (S51), and the corrected time is stored in association with sensing data (S52).

Thereafter, the master unit 10 calculates the average value of the differences between the intervals of the rising waveforms acquired from the first slave unit 20a on the upstream side and the intervals of the rising waveforms acquired thereafter from the second slave unit 20b on the downstream side (S53).

When the number of items of the calculated average value is equal to or larger than a predetermined number (S54: YES), the master unit 10 determines whether or not a combination in which the average value becomes the smallest is uniquely set (S55). When a combination in which the average value becomes the smallest is uniquely set (S55: YES), the master unit 10 performs mapping of the rising waveforms in accordance with the combination in which the average value becomes the smallest (S56). On the other hand, when a combination in which the average value becomes the smallest is not uniquely set (S55: NO), the master unit 10 performs mapping of the rising waveforms in accordance with a combination in which the average value becomes the smallest and the number of items for calculating an average value becomes the largest (S57). When the number of items of the calculated average value is not equal to or larger than a predetermined number (S54: NO), the master unit 10 may wait for accumulation of data and execute mapping again.

Figure 18:
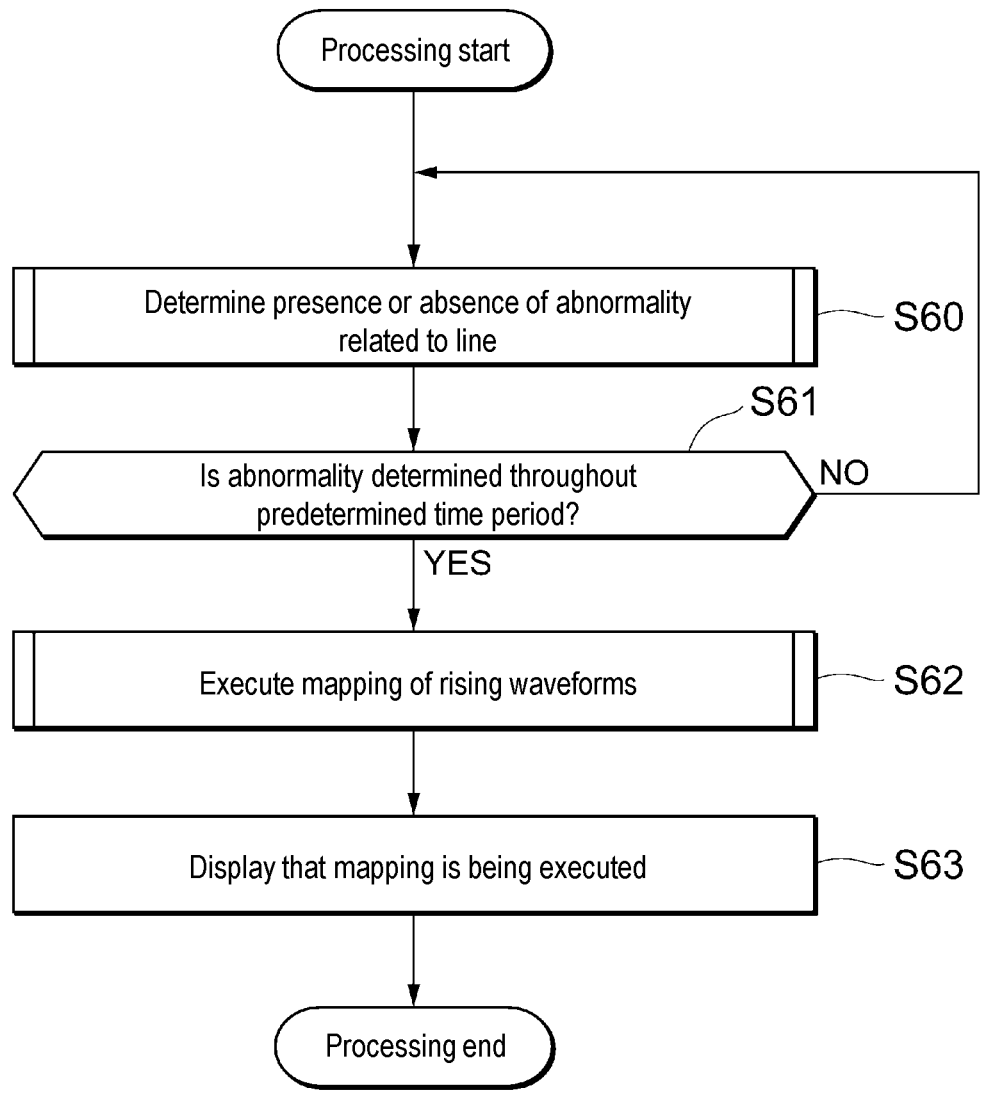
FIG. 18 is a flowchart of sixth processing executed by the master unit according to the fourth modification example of the present embodiment.

FIG. 18 is a flowchart of sixth processing executed by the master unit 10 according to the fourth modification example of the present embodiment. First, the master unit 10 determines the presence or absence of an abnormality which relates to the line L (S60). Determination of the presence or absence of an abnormality which relates to the line L (S60) may be the first processing shown in FIG. 6, for example.

In a case in which the determination part 15 continuously determines that the state of a workpiece has changed throughout a predetermined time period, the mapping part 19 may perform mapping of rising waveforms or falling waveforms. In this example, when an abnormality is not determined throughout the predetermined time period (S61: NO), determination of the presence or absence of an abnormality which relates to the line L (S60) is repeated, and when an abnormality is determined throughout the predetermined time period (S61: YES), the master unit 10 executes mapping of the rising waveforms (S62). In this manner, when it is erroneously determined in a continuous manner that there is an abnormality in the line L due to inappropriate mapping of the rising waveforms, mapping of the rising waveforms can be automatically revised, and thus it is possible to correctly determine the state of the line L.

Lastly, the master unit 10 causes the display part 16 to display that processing of mapping (S62) is being executed (S63). Accordingly, it is possible to visually inform that the master unit 10 is in a state in which the state of a workpiece cannot be determined temporarily. While processing of mapping (S62) is being executed, the master unit 10 may not execute determination processing of the determination part 15. However, the plurality of slave units 20 may continue to acquire data from the plurality of sensors 30.

Figure 19:
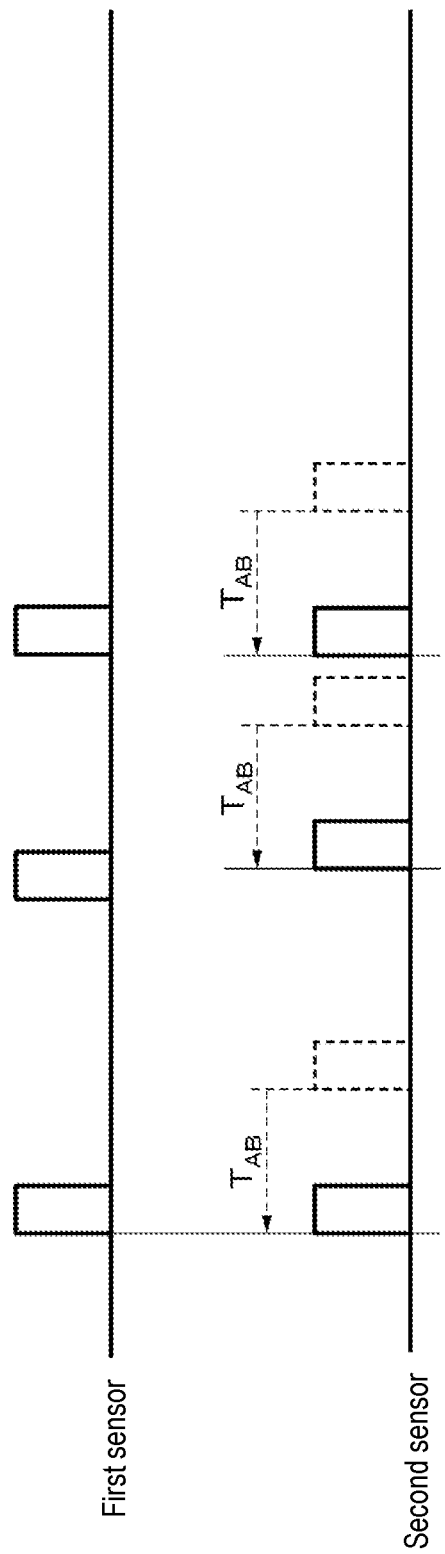
FIG. 19 is a diagram showing a sixth example of data measured by a sensor system according to a fifth modification example of the present embodiment.

FIG. 19 is a diagram showing a sixth example of data measured by a sensor system 1E according to a fifth modification example of the present embodiment. The sensor system 1E according to the fifth modification example acquires time series data including rising waveforms or falling waveforms in accordance with the passing states of a workpiece being conveyed upon the line L. In the same diagram, the data measured by the first sensor 30a is indicated by a solid line, the data measured by the second sensor 30b is indicated by a dotted line, and the data obtained by shifting the data measured by the second sensor 30b by $T_{AB}$ is indicated by a solid line. The sensor system 1E according to the fifth modification example of the present embodiment has configurations similar to those of the sensor system 1.

The determination part 15 may compare the time series data acquired by the first slave unit 20a of the plurality of slave units 20 and the time series data acquired by the second slave unit 20b of the plurality of slave units 20 by shifting any one thereof by a predetermined time and determine a change in state of a workpiece on the basis of a time difference between the rising waveforms or the falling waveforms acquired by the first slave unit 20a and the rising waveforms or the falling waveforms acquired by the second slave unit 20b. As shown in FIG. 19, the determination part 15 may shift the data measured by the second sensor 30b by $T_{AB}$ such that the rising waveforms of the data measured by the first sensor 30a and the rising waveforms of the data measured by the second sensor 30b align with each other. Here, the shift amount $T_{AB}$ may be set in advance or may be decided by conveying a test workpiece on the line L. The determination part 15 may compare the rising timings of the rising waveforms included in the data after a shift and determine that a change has occurred in the state of a workpiece when a timing deviation has occurred or mapping of the falling waveforms cannot be performed.

Figure 20:
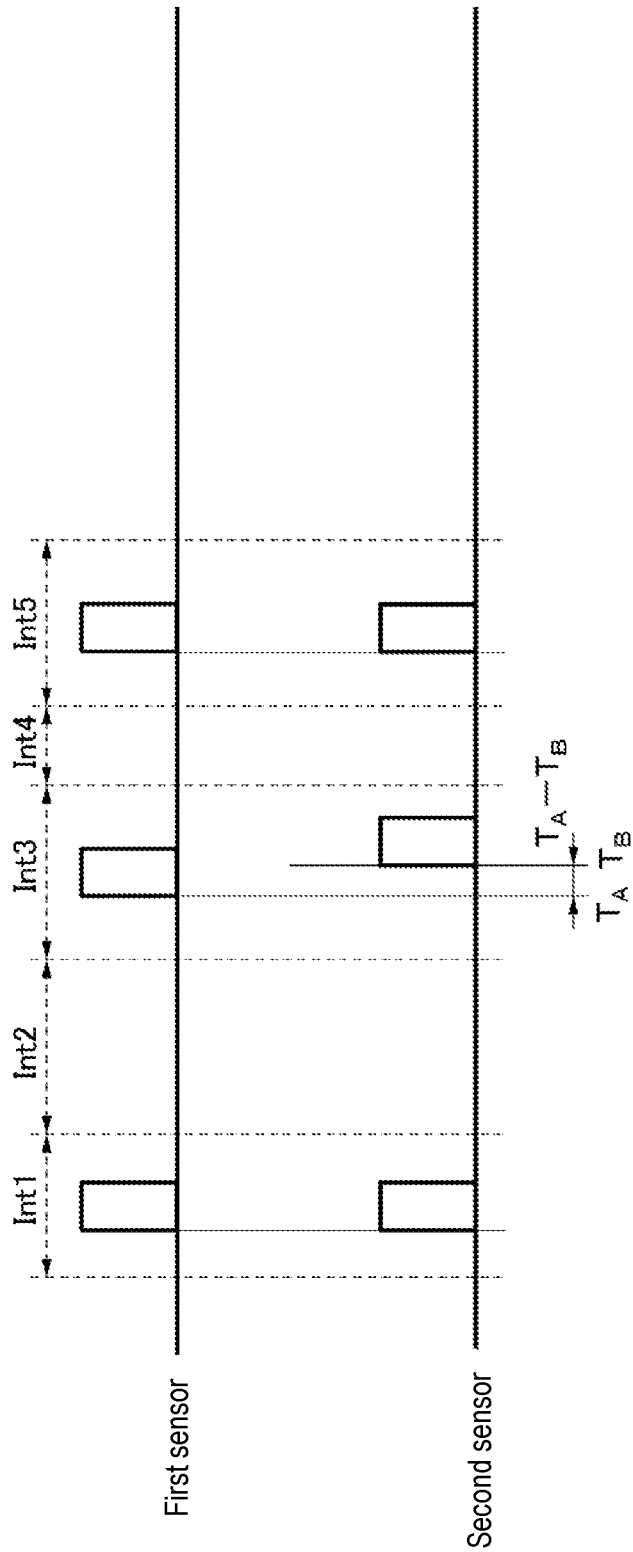
FIG. 20 is a diagram showing a seventh example of data measured by the sensor system according to the fifth modification example of the present embodiment.

FIG. 20 is a diagram showing a seventh example of data measured by the sensor system 1E according to the fifth modification example of the present embodiment. In the same diagram, data obtained after shifting the data measured by the second sensor 30b by $T_{AB}$ is shown. In addition, in the same diagram, the data is shown in a manner of being divided into a first section Int1, a second section Int2, a third section Int3, a fourth section Int4, and a fifth section Int5.

The determination part 15 may shift any one of the time series data acquired by the first slave unit 20a of the plurality of slave units 20 and the time series data acquired by the second slave unit 20b of the plurality of slave units 20 by a predetermined time and divide each piece of the time series data into a plurality of sections such that one or fewer rising waveform or falling waveform is included. That is, the determination part 15 may divide the time series data such that one section includes one rising waveform or one falling waveform or does not include a rising waveform or a falling waveform. Accordingly, the time series data is compared for each of the plurality of sections, and thus it is possible to determine a change in state of a workpiece. In the case of this example, each of the first section Int1, the third section Int3, and the fifth section Int5 includes one rising waveform measured by the first sensor 30a and one rising waveform measured by the second sensor 30b, and the second section Int2 and the fourth section Int4 do not include any of a rising waveform measured by the first sensor 30a and a rising waveform measured by the second sensor 30b.

The determination part 15 may determine a change in state of a workpiece on the basis of a time difference $(T_A-T_B)$ between the rising waveform of the data measured by the first sensor 30a and the rising waveform of the data measured by the second sensor 30b included in the third section Int3. The determination part 15 shifts the data measured by the second sensor 30b by $T_{AB}$. Thereafter, when the difference $(T_A-T_B)$ between the timing $T_A$ of the rising waveform of the data measured by the first sensor 30a included in the third section Int3 and the timing $T_B$ of the rising waveform of the data measured by the second sensor 30b included in the third section Int3 is equal to or greater than a threshold TH, the determination part 15 may determine that a positional deviation of a workpiece has occurred on the line L. In this manner, even when the conveyance speed of the line L temporarily becomes slower or faster, the pieces of time series data measured by two sensors 30 are appropriately compared to each other, and thus it is possible to detect a deviation in the data.

Figure 21:
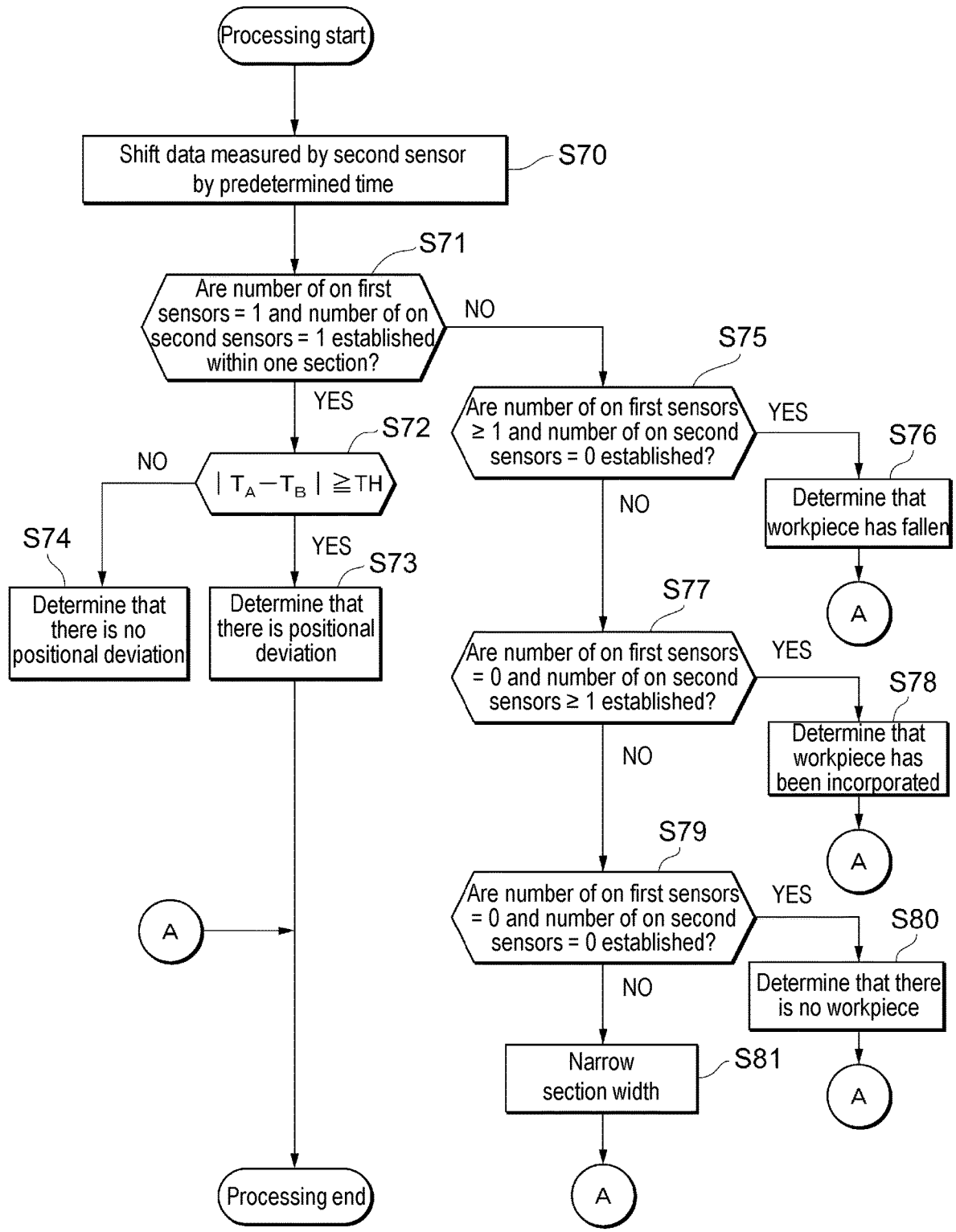
FIG. 21 is a flowchart of seventh processing executed by the master unit according to the fifth modification example of the present embodiment.

FIG. 21 is a flowchart of seventh processing executed by the master unit 10 according to the fifth modification example of the present embodiment. First, the master unit 10 shifts the data measured by the second sensor 30b by a predetermined time (S70). The master unit 10 may use any piece of the data measured by the plurality of sensors 30 as a reference to shift other data such that the rising waveforms of the other data match the rising waveforms of the data serving as a reference.

The master unit 10 divides the shifted data into a plurality of sections and determines whether or not the number of on first sensors 30a=1 and the number of on second sensors 30b=1 are established within one section (S71). Here, the number of on sensors indicates the number of times of obtaining a signal expressing that a workpiece is detected by the sensor 30. When the number of on first sensors 30a=1 and the number of on second sensors 30b=1 are established within one section (S71: YES), the master unit 10 determines whether the difference between the rising waveform of the data measured by the first sensor 30a and the rising waveform of the data measured by the second sensor 30b in the section is equal to or greater than a threshold ($|T_A-T_B| \geq TH$) (S72). When the difference is equal to or greater than the threshold (S72: YES), the master unit 10 determines that there is a positional deviation of a workpiece (S73) and outputs a warning to the outside or causes the display part 16 to display that a positional deviation has occurred. On the other hand, when the difference is not equal to or greater than the threshold (S72: NO), the master unit 10 determines that a positional deviation of a workpiece has not occurred (S74).

On the other hand, when the number of on first sensors 30a=1 and the number of on second sensors 30b=1 are not established (S71: NO), the master unit 10 determines whether or not the number of on first sensors 30a≥1 and the number of on second sensors 30b=0 are established (S75). In a case in which the first sensor 30a connected to the first slave unit 20a is positioned upstream in the line L from the second sensor 30b connected to the second slave unit 20b, the determination part 15 may determine that a workpiece has fallen from the line L when the rising waveforms or the falling waveforms acquired by the second slave unit 20b corresponding to the rising waveforms or the falling waveforms acquired by the first slave unit 20a is not present. Here, when the number of on first sensors 30a≥1 and the number of on second sensors 30b=0 are established (S75:

YES), a workpiece is detected by the first slave unit 20a on the upstream side but no workpiece is detected by the second slave unit 20b on the downstream side. Therefore, the master unit 10 determines that a workpiece has fallen (S76) and outputs a warning to the outside or causes the display part 16 to display that falling has occurred. Accordingly, it is possible to determine that falling of a workpiece has occurred by identifying a case in which a workpiece is detected by the sensor 30 positioned upstream in the line L but no workpiece is detected by the sensor 30 positioned downstream in the line L.

On the other hand, when the number of on first sensors 30a≥1 and the number of on second sensors 30b=0 are not established (S75: NO), the master unit 10 determines whether or not the number of on first sensors 30a=0 and the number of on second sensors 30b≥1 are established (S77). In a case in which the first sensor 30a connected to the first slave unit 20a is positioned upstream in the line L from the second sensor 30b connected to the second slave unit 20b, the determination part 15 may determine that a workpiece has been incorporated into the line L when the rising waveforms or the falling waveforms acquired by the first slave unit 20a corresponding to the rising waveforms or the falling waveforms acquired by the second slave unit 20b is not present. Here, when the number of on first sensors 30a=0 and the number of on second sensors 30b≥1 are established (S77: YES), no workpiece is detected by the first slave unit 20a on the upstream side but a workpiece is detected by the second slave unit 20b on the downstream side. Therefore, the master unit 10 determines that a workpiece has been incorporated thereinto (S78) and outputs a warning to the outside or causes the display part 16 to display that incorporation has occurred. Accordingly, it is possible to determine that incorporation of a workpiece has occurred by identifying a case in which no workpiece is detected by the sensor 30 positioned upstream in the line L but a workpiece is detected by the sensor 30 positioned downstream in the line L.

Moreover, when the number of on first sensors 30a=0 and the number of on second sensors 30b≥1 are not established (S77: NO), the master unit 10 determines whether or not the number of on first sensors 30a=0 and the number of on second sensors 30b=0 are established (S79). When the number of on first sensors 30a=0 and the number of on second sensors 30b=0 are established (S79), the master unit 10 determines that there is no workpiece (S80). On the other hand, when the number of on first sensors 30a=0 and the number of on second sensors 30b=0 are not established (S79: NO), the width of the set section is excessively wide, and thus the master unit 10 narrows the section width (S81). Thereafter, the master unit 10 may repeat the processing S71 and the subsequent steps.

Figure 22:
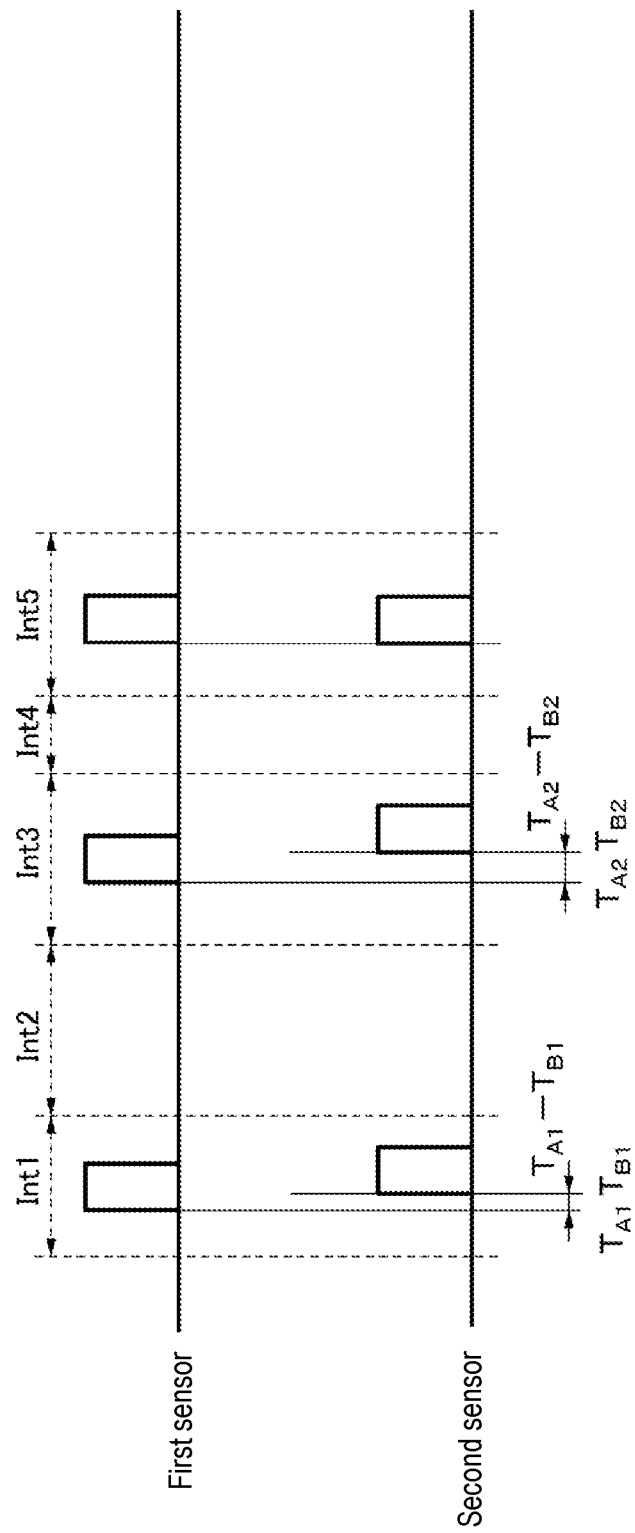
FIG. 22 is a diagram showing an eighth example of data measured by the sensor system according to the fifth modification example of the present embodiment.

FIG. 22 is a diagram showing an eighth example of data measured by the sensor system 1E according to the fifth modification example of the present embodiment. In the same diagram, data obtained after shifting the data measured by the second sensor 30b by $T_{AB}$ is shown. In addition, in the same diagram, the data is shown in a manner of being divided into the first section Int1, the second section Int2, the third section Int3, the fourth section Int4, and the fifth section Int5.

The determination part 15 may calculate a first time difference ($T_{A1}-T_{B1}$) between the rising waveforms or the falling waveforms acquired by the first slave unit 20a included in the first section Int1 of the plurality of sections and the rising waveforms or the falling waveforms acquired by the second slave unit 20b included in the first section Int1, and a second time difference ($T_{A2}-T_{B2}$) between the rising waveforms or the falling waveforms acquired by the first slave unit 20a included in the third section Int3 of the plurality of sections and the rising waveforms or the falling waveforms acquired by the second slave unit 20b included in the third section Int3, and determine a change in state of a workpiece on the basis of the difference $|(T_{A1}-T_{B1})-(T_{A2}-T_{B2})|$ between the first time difference and the second time difference. When the difference $|(T_{A1}-T_{B1})-(T_{A2}-T_{B2})|$ between the first time difference and the second time difference is equal to or greater than the threshold TH, the determination part 15 may determine that a positional deviation of a workpiece has occurred on the line L. In this manner, even when the conveyance speed of the line L temporarily becomes slower or faster, the pieces of time series data measured by two sensors 30 are appropriately compared to each other, and thus it is possible to detect a deviation in the data. In addition, since determination is performed by such a method, even when the conveyance speed of the line L is gradually changed, it is no longer erroneously determined as an abnormality.

Figure 23:
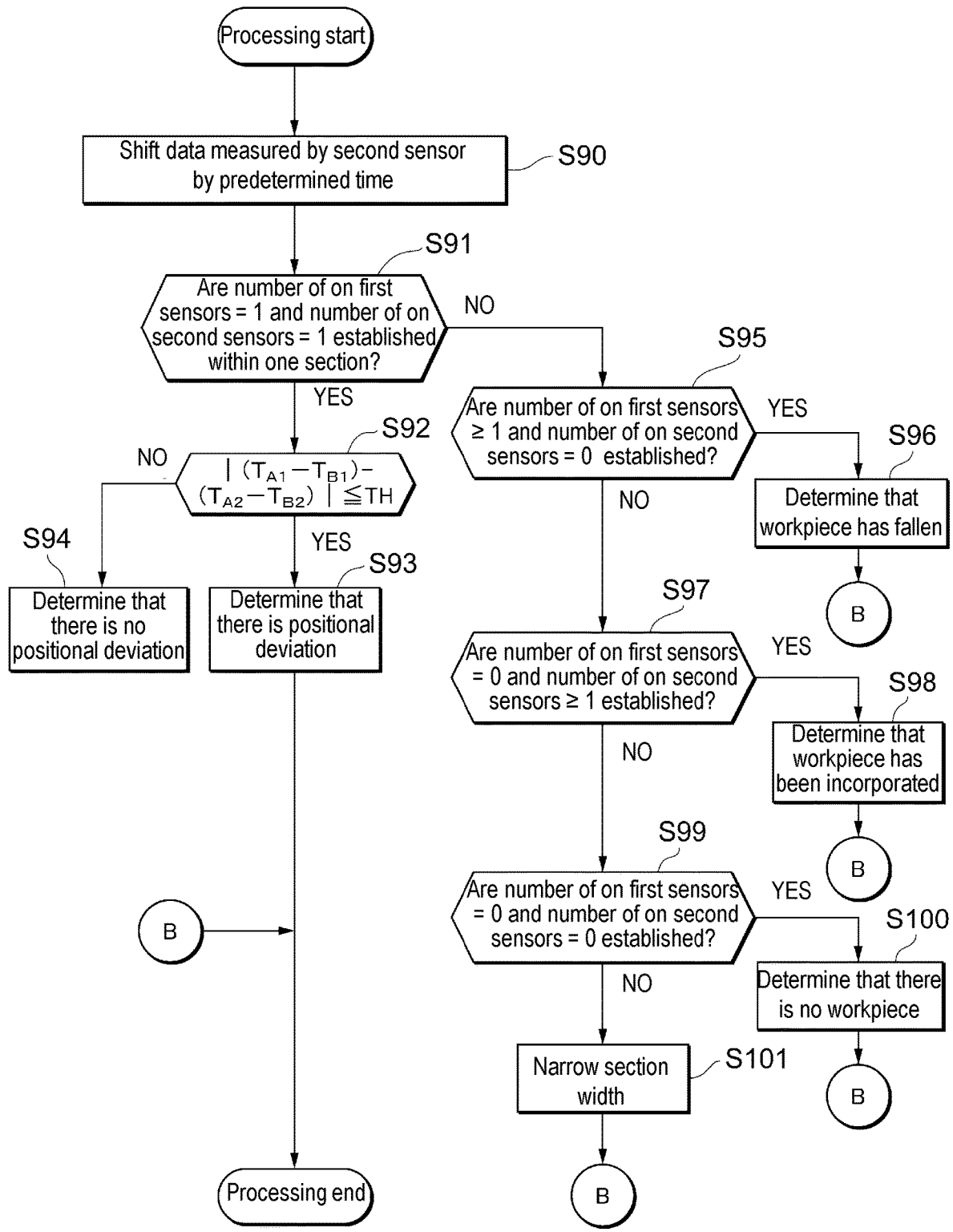
FIG. 23 is a flowchart of eighth processing executed by the master unit according to the fifth modification example of the present embodiment.

FIG. 23 is a flowchart of eighth processing executed by the master unit 10 according to the fifth modification example of the present embodiment. First, the master unit 10 shifts the data measured by the second sensor 30b by a predetermined time (S90). The master unit 10 may use any piece of the data measured by the plurality of sensors 30 as a reference to shift other data such that the rising waveforms of the other data match the rising waveforms of the data serving as the reference.

The master unit 10 divides the shifted data into a plurality of sections and determines whether or not the number of on first sensors 30a=1 and the number of on second sensors 30b=1 are established within one section (S91). When the number of on first sensors 30a=1 and the number of on second sensors 30b=1 are established within one section (S91: YES), the master unit 10 determines whether the difference between the first time difference ($T_{A1}-T_{B1}$) between the rising waveform of the data measured by the first sensor 30a and the rising waveform of the data measured by the second sensor 30b in the section and the second time difference ($T_{A2}-T_{B2}$) between the rising waveform of the data measured by the first sensor 30a and the rising waveform of the data measured by the second sensor 30b in a different section adjacent to the section with one section therebetween is equal to or greater than the threshold ($|(T_{A1}-T_{B1})-(T_{A2}-T_{B2})|\geq$TH) (S92). When the difference is equal to or greater than the threshold (S92: YES), the master unit 10 determines that there is a positional deviation of a workpiece (S93) and outputs a warning to the outside or causes the display part 16 to display that a positional deviation has occurred. On the other hand, when the difference is not equal to or greater than the threshold (S92: NO), the master unit 10 determines that a positional deviation of a workpiece has not occurred (S94).

On the other hand, when the number of on first sensors 30a=1 and the number of on second sensors 30b=1 are not established (S91: NO), the master unit 10 determines whether or not the number of on first sensors 30a≥1 and the number of on second sensors 30b=0 are established (S95). In a case in which the first sensor 30a connected to the first slave unit 20a is positioned upstream in the line L from the second sensor 30b connected to the second slave unit 20b, the determination part 15 may determine that a workpiece has fallen from the line L when the rising waveforms or the falling waveforms acquired by the second slave unit 20b corresponding to the rising waveforms or the falling waveforms acquired by the first slave unit 20a is not present. Here, when the number of on first sensors 30a≥1 and the number of on second sensors 30b=0 are established (S95: YES), a workpiece is detected by the first slave unit 20a on the upstream side but no workpiece is detected by the second slave unit 20b on the downstream side. Therefore, the master unit 10 determines that a workpiece has fallen (S96) and outputs a warning to the outside or causes the display part 16 to display that falling has occurred. Accordingly, it is possible to determine that falling of a workpiece has occurred by identifying a case in which a workpiece is detected by the sensor 30 positioned upstream in the line L but no workpiece is detected by the sensor 30 positioned downstream in the line L.

On the other hand, when the number of on first sensors 30a≥1 and the number of on second sensors 30b=0 are not established (S95: NO), the master unit 10 determines whether or not the number of on first sensors 30a=0 and the number of on second sensors 30b≥1 are established (S97). In a case in which the first sensor 30a connected to the first slave unit 20a is positioned upstream in the line L from the second sensor 30b connected to the second slave unit 20b, the determination part 15 may determine that a workpiece has been incorporated into the line L when the rising waveforms or the falling waveforms acquired by the first slave unit 20a corresponding to the rising waveforms or the falling waveforms acquired by the second slave unit 20b is not present. Here, when the number of on first sensors 30a=0 and the number of on second sensors 30b≥1 are established (S97: YES), no workpiece is detected by the first slave unit 20a on the upstream side but a workpiece is detected by the second slave unit 20b on the downstream side. Therefore, the master unit 10 determines that a workpiece has been incorporated thereinto (S98) and outputs a warning to the outside or causes the display part 16 to display that incorporation has occurred. Accordingly, it is possible to determine that incorporation of a workpiece has occurred by identifying a case in which no workpiece is detected by the sensor 30 positioned upstream in the line L but a workpiece is detected by the sensor 30 positioned downstream in the line L.

Moreover, when the number of on first sensors 30a=0 and the number of on second sensors 30b≥1 are not established (S97: NO), the master unit 10 determines whether or not the number of on first sensors 30a=0 and the number of on second sensors 30b=0 are established (S99). When the number of on first sensors 30a=0 and the number of on second sensors 30b=0 are established (S99), the master unit 10 determines that there is no workpiece (S100). On the other hand, when the number of on first sensors 30a=0 and the number of on second sensors 30b=0 are not established (S99: NO), the width of the set section is excessively wide, and thus the master unit 10 narrows the section width (S101). Thereafter, the master unit 10 may repeat the processing S71 and the subsequent steps.

Figure 24:
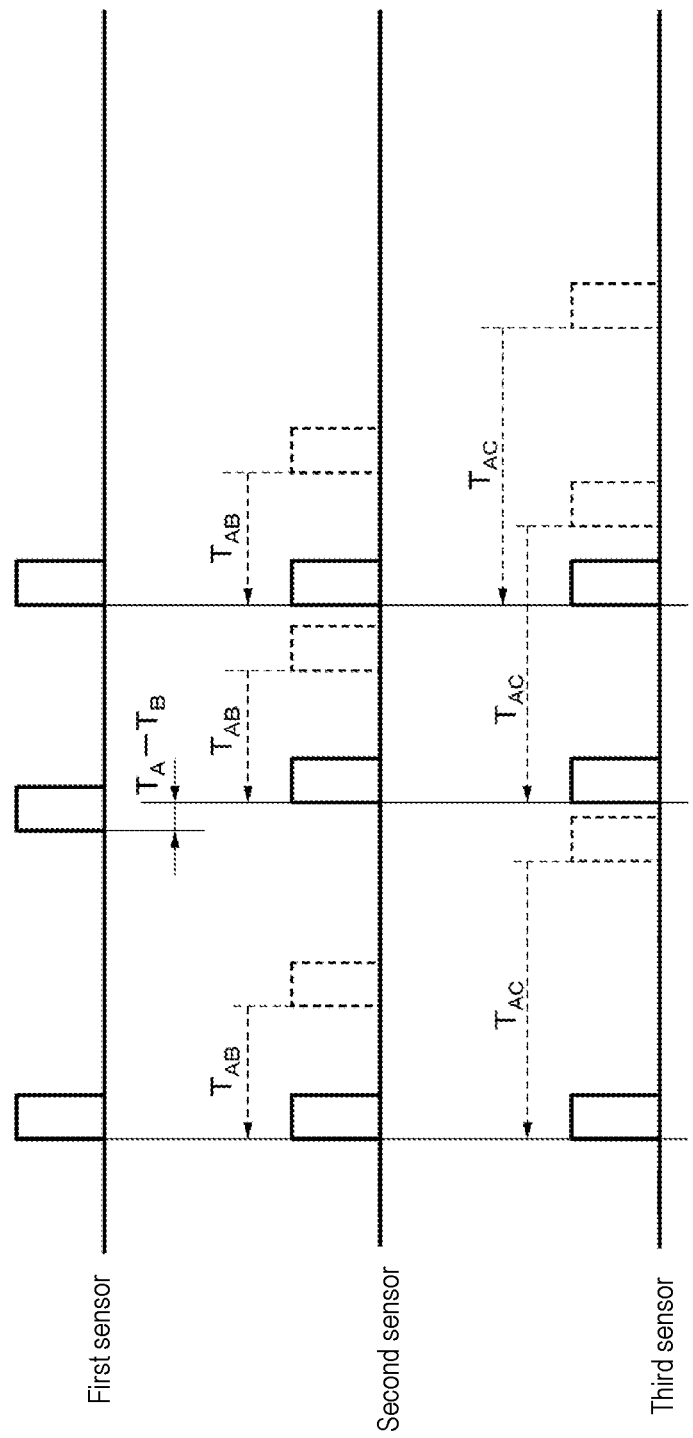
FIG. 24 is a diagram showing a ninth example of data measured by the sensor system according to the fifth modification example of the present embodiment.

FIG. 24 is a diagram showing a ninth example of data measured by the sensor system 1E according to the fifth modification example of the present embodiment. In the same diagram, the data measured by the first sensor 30a is indicated by a solid line, the data measured by the second sensor 30b is indicated by a dotted line, the data obtained by shifting the data measured by the second sensor 30b by $T_{AB}$ is indicated by a solid line, the data measured by the third sensor 30c is indicated by a dotted line, and the data obtained by shifting the data measured by the third sensor 30c by $T_{AC}$ is indicated by a solid line.

The determination part 15 may shift the data measured by the second sensor 30b by $T_{AB}$ and shift the data measured by the third sensor 30c by $T_{AC}$ such that the rising waveform of the data measured by the first sensor 30a and the rising waveform of the data measured by the second sensor 30b are aligned with each other and the rising waveform of the data measured by the first sensor 30a and the rising waveform of the data measured by the third sensor 30c are aligned with each other. Here, the shift amounts $T_{AB}$ and $T_{AC}$ may be set in advance or may be decided by conveying a test workpiece on the line L.

In the case of this example, in comparison between the pieces of the shifted data, when the first rising waveforms are aligned with each other, the second rising waveforms are not aligned with each other between the data measured by the first sensor 30a and the data measured by the second sensor 30b, and a deviation of $T_A-T_B$ has occurred. On the other hand, the second rising waveforms are aligned with each other between the data measured by the second sensor 30b and the data measured by the third sensor 30c. That is, the second rising waveforms are not aligned with each other between the data measured by the first sensor 30a and the data measured by the third sensor 30c, and a deviation of $T_A-T_B$ has occurred.

The determination part 15 may determine a change in state of a workpiece by comparing pieces of the time series data which are acquired by three or more slave units 20, of the plurality of slave units 20, positioned in order along the line L and shifted by a predetermined time and determine an abnormal section in the line on the basis of a determined section in which the state of the workpiece has changed. In the case of this example, when the difference $|T_A-T_B|$ between the rising waveform measured by the first sensor 30a and the rising waveform measured by the second sensor 30b is equal to or greater than the threshold, the determination part 15 determines that a positional deviation of a workpiece has occurred. Since the difference between the rising waveform measured by the second sensor 30b and the rising waveform measured by the third sensor 30c is substantially zero, it may be determined that an abnormal section in the line L is a section from a location where the first sensor 30a is positioned to a location where the second sensor 30b is positioned.

In this manner, it is possible to identify not only a fact that an abnormality has occurred in the line L but also a section in which an abnormality has occurred, and thus it is possible to send information for identifying a cause of an abnormality at an earlier stage.

Figure 25:
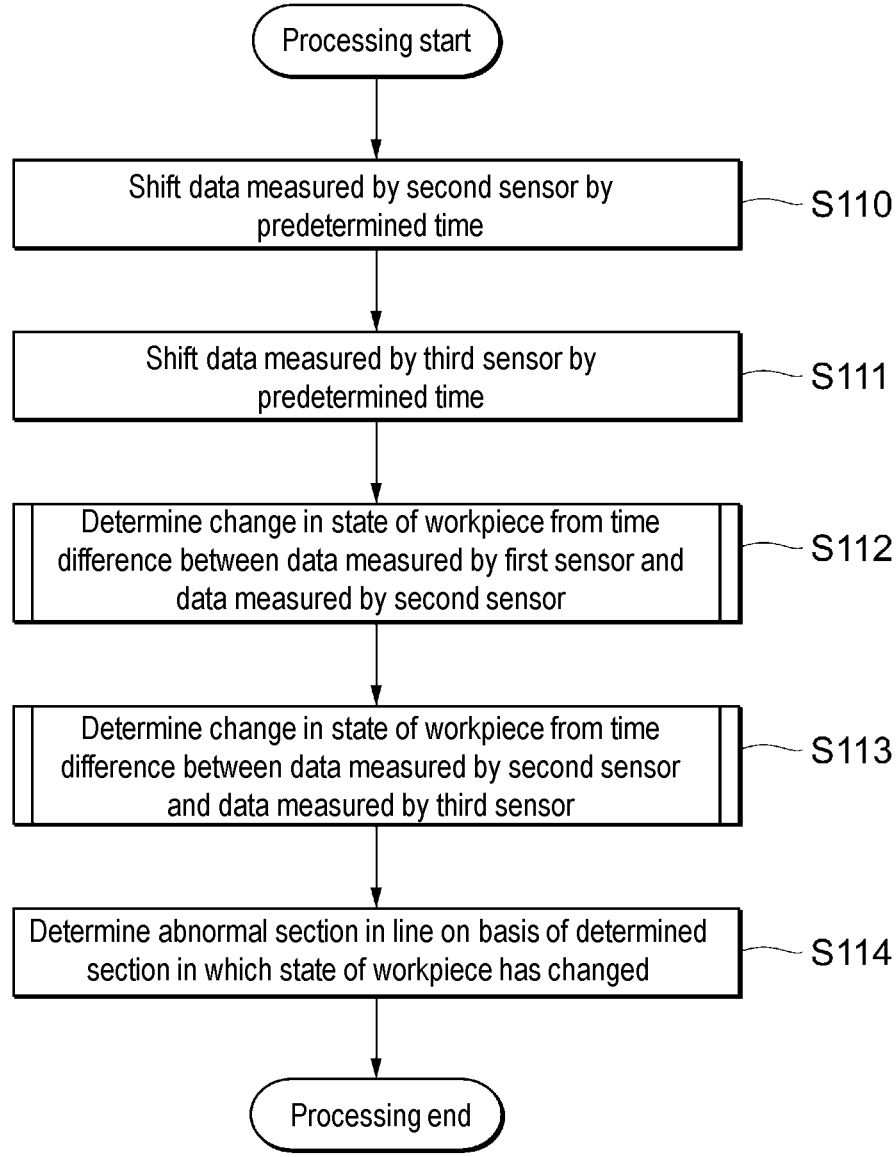
FIG. 25 is a flowchart of ninth processing executed by the master unit according to the fifth modification example of the present embodiment.

FIG. 25 is a flowchart of ninth processing executed by the master unit 10 according to the fifth modification example of the present embodiment. First, the master unit 10 shifts the data measured by the second sensor 30b by the predetermined time $T_{AB}$ (S110) and shifts the data measured by the third sensor 30c by the predetermined time $T_{AC}$ (S111).

Thereafter, the master unit 10 determines a change in state of a workpiece from the time difference between the data measured by the first sensor 30a and the data measured by the second sensor 30b (S112) and determines a change in state of a workpiece from the time difference between the data measured by the second sensor 30b and the data measured by the third sensor 30c (S113). For example, the processing S112 and the processing S113 may be the seventh processing shown in FIG. 21.

The master unit 10 determines an abnormal section in the line L on the basis of a determined section in which the state of a workpiece has changed. For example, when it is determined in the processing S112 that the state of a workpiece has changed and it is determined in the processing S113 that the state of a workpiece has not changed, the master unit 10 may determine that an abnormality has occurred in the line L in a section from the location where the first sensor 30*a* is positioned to the location where the second sensor 30*b* is positioned. Similarly, when it is determined in the processing S112 that the state of a workpiece has not changed and it is determined in the processing S113 that the state of a workpiece has changed, the master unit 10 may determine that an abnormality has occurred in the line L in a section from the location where the second sensor 30*b* is positioned to the location where the third sensor 30*c* is positioned.

The embodiment described above is given to facilitate the understanding of the present invention and is not intended to be interpreted by limiting the present invention. The elements of the embodiment including the positions, the materials, the conditions, the shapes, the sizes, and the like thereof are not limited to the examples and can be suitably changed. In addition, it is possible to partially replace or combine the configurations shown in a different embodiment.

[Appendix 1]

There is provided a sensor system (1) including a plurality of sensors (30*a*, 30*b*, and 30*c*) positioned along a line (L) and measuring data indicating that a workpiece being conveyed upon the line (L) has passed by, a plurality of slave units (20*a*, 20*b*, and 20*c*) respectively connected to the plurality of sensors (30*a*, 30*b*, and 30*c*) and acquiring the data measured by the plurality of sensors (30*a*, 30*b*, and 30*c*), and a master unit (10) connected to the plurality of slave units (20*a*, 20*b*, and 20*c*). The master unit (10) has a storage part (14) for storing the data in association with information which relates to the timing at which the data was measured; and a determination part (15) for comparing the data transmitted from two or more of the plurality of slave units (20*a*, 20*b*, and 20*c*) using the information which relates to the timing, and determining a change in state of the workpiece.

The invention claimed is:

1. A sensor system comprising:
    a plurality of sensors positioned along a line and measuring data indicating a passing state of a workpiece being conveyed upon the line, wherein the passing state indicates whether a workpiece is within a detection range of the sensor;
    a plurality of slave units respectively connected to the plurality of sensors and acquiring the data measured by the plurality of sensors; and
    a master unit connected to the plurality of slave units, wherein the master unit has:
        a storage part for storing the data in association with information which relates to the timing at which the data was measured, and
        a determination part for comparing the data transmitted from two or more of the plurality of slave units using the information which relates to the timing, and determining a change in state of the workpiece,
    wherein the data is time series data including rising waveforms or falling waveforms in accordance with the passing states of the workpiece being conveyed upon the line, and
    wherein the master unit further includes a mapping part for mapping the rising waveforms or the falling waveforms acquired by two or more of the plurality of slave units regarding the same workpiece on the basis of intervals of the rising waveforms or intervals of the falling waveforms included in the time series data acquired by the two or more slave units,
    wherein the mapping part calculates differences between the intervals of the rising waveforms or the intervals of the falling waveforms acquired by the first slave unit and the intervals of the rising waveforms or the intervals of the falling waveforms acquired by the second slave unit, calculates an average value of the differences in each of a plurality of combinations of the differences, searches for the combination of the differences having the average value as the smallest, and performs mapping of rising waveforms or falling waveforms acquired by a first slave unit of the plurality of slave units and rising waveforms or falling waveforms acquired by a second slave unit of the plurality of slave units in accordance with the differences in the searched combination,
    wherein the determination part calculates timings at which the workpiece has to pass through detection ranges of the plurality of sensors on the basis of a conveyance speed of the line and positions of the plurality of sensors; compares the data measured by a sensor, of the plurality of sensors, positioned upstream in the line and the data measured at the timing at which the workpiece has to pass by with a sensor, of the plurality of sensors, positioned downstream in the line; and determines a positional deviation of the workpiece, and
    wherein the determination part determines a change in the conveyance speed of the workpiece on the basis of a difference between a time period during which the workpiece is detected by the sensor positioned upstream in the line and a time period during which the workpiece is detected by the sensor positioned downstream in the line.

2. The sensor system according to claim 1, wherein the determination part determines falling of the workpiece on the basis of a correspondence relationship between the data measured by the sensor positioned upstream in the line and the data measured by the sensor positioned downstream in the line.

3. The sensor system according to claim 1, wherein the storage part stores a learned model generated through machine learning using learning data including the data measured by the sensor positioned upstream in the line, the data measured by the sensor positioned downstream in the line, and information indicating the change in state of the workpiece, and wherein the determination part inputs at least the data measured by the sensor positioned upstream in the line and the data measured by the sensor positioned downstream in the line to the learned model and determines the change in state of the workpiece on the basis of the output of the learned model.

4. The sensor system according to claim 1, wherein the master unit has a timer, and wherein the storage part stores a time measured by the timer in association with the data.

5. The sensor system according to claim 1, wherein the master unit has a trigger sending part for sending a trigger signal which serves as a time reference to the plurality of slave units, wherein the plurality of slave units respectively have timers, measure elapsed times after the trigger signals are received by the timers, and transmit the elapsed times together with the data to the master unit, and wherein the storage part stores the elapsed times in association with the data.

6. The sensor system according to claim 1, wherein the plurality of slave units respectively have timers for performing synchronization between the plurality of slave units and transmit the times measured by the timers together with the data to the master unit, and
wherein the storage part stores the times measured by the timers in association with the data.

7. The sensor system according to claim 1, wherein the master unit has a reception part for receiving a signal which serves as a time reference from an external instrument, and
wherein the storage part stores a time calculated on the basis of a signal which serves as the time reference in association with the data.

8. The sensor system according to claim 1, wherein the master unit further has a correction part for correcting the information which relates to the timing on the basis of at least any of response times of the sensors and transmission delay times from the slave units to the master unit.

9. The sensor system according to claim 1, wherein in a case in which the sensor connected to the first slave unit is positioned upstream in the line from the sensor connected to the second slave unit, the mapping part performs mapping of rising waveforms or falling waveforms acquired by the first slave unit and rising waveforms or falling waveforms acquired by the second slave unit such that the average value of the differences between the intervals of the rising waveforms or the intervals of the falling waveforms acquired by the first slave unit and the intervals of the rising waveforms or the intervals of the falling waveforms acquired thereafter by the second slave unit decreases.

10. The sensor system according to claim 1, wherein the mapping part performs mapping of rising waveforms or falling waveforms acquired by the first slave unit and rising waveforms or falling waveforms acquired by the second slave unit from combinations in which a number of items for calculating the average value is equal to or greater than a predetermined number.

11. The sensor system according to claim 1, wherein the mapping part performs mapping of rising waveforms or falling waveforms acquired by the first slave unit and rising waveforms or falling waveforms acquired by the second slave unit such that a number of items for calculating the average value increases.

12. The sensor system according to claim 1, wherein in a case in which the determination part continuously determines that a state of the workpiece has changed throughout a predetermined time period, the mapping part performs mapping of the rising waveforms or the falling waveforms.

13. The sensor system according to claim 1, wherein the mapping part performs mapping of the rising waveforms or the falling waveforms regarding a selected portion of the plurality of slave units.

14. The sensor system according to claim 1, wherein the master unit further includes a display part for displaying that mapping is being executed by the mapping part.

15. The sensor system according to claim 1, wherein the data is time series data including rising waveforms or falling waveforms in accordance with the passing states of the workpiece being conveyed upon the line, and
wherein the determination part compares the time series data acquired by the first slave unit of the plurality of slave units and the time series data acquired by the second slave unit of the plurality of slave units after shifting any one thereof by a predetermined time and determines the change in state of the workpiece on the basis of a time difference between the rising waveforms or the falling waveforms acquired by the first slave unit and the rising waveforms or the falling waveforms acquired by the second slave unit.

16. The sensor system according to claim 15, wherein in a case in which the sensor connected to the first slave unit is positioned upstream in the line from the sensor connected to the second slave unit, the determination part determines that the workpiece has fallen from the line when the rising waveforms or the falling waveforms acquired by the second slave unit corresponding to the rising waveforms or the falling waveforms acquired by the first slave unit is not present.

17. The sensor system according to claim 15, wherein in a case in which the sensor connected to the first slave unit is positioned upstream in the line from the sensor connected to the second slave unit, the determination part determines that the workpiece has been incorporated into the line when the rising waveforms or the falling waveforms acquired by the first slave unit corresponding to the rising waveforms or the falling waveforms acquired by the second slave unit is not present.

18. The sensor system according to claim 15, wherein the determination part shifts any one of the time series data acquired by the first slave unit of the plurality of slave units and the time series data acquired by the second slave unit of the plurality of slave units by the predetermined time and divides each piece of the time series data into a plurality of sections such that one or fewer rising waveform or falling waveform is included.

19. The sensor system according to claim 18, wherein the determination part calculates a first time difference between the rising waveforms or the falling waveforms acquired by the first slave unit included in a first section of the plurality of sections and the rising waveforms or the falling waveforms acquired by the second slave unit included in the first section and a second time difference between the rising waveforms or the falling waveforms acquired by the first slave unit included in a second section of the plurality of sections and the rising waveforms or the falling waveforms acquired by the second slave unit included in the second section, and determines the change in state of the workpiece on the basis of a difference between the first time difference and the second time difference.

20. The sensor system according to claim 15, wherein the determination part determines the change in state of the workpiece by comparing pieces of the time series data which are acquired by three or more slave units, of the plurality of slave units, positioned in order along the line and shifted by the predetermined time and determines an abnormal section in the line on the basis of a determined section in which the state of the workpiece has changed.

* * * * *